United States Patent
Sebastian

(10) Patent No.: US 9,935,740 B2
(45) Date of Patent: Apr. 3, 2018

(54) TRANSPORT PROTOCOL FOR ANTICIPATORY CONTENT

(71) Applicant: ViaSat Inc., Carlsbad, CA (US)

(72) Inventor: William B. Sebastian, E. Falmouth, MA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 14/517,337

(22) Filed: Oct. 17, 2014

(65) Prior Publication Data

US 2015/0036686 A1 Feb. 5, 2015

Related U.S. Application Data

(63) Continuation of application No. 13/517,860, filed on Jun. 14, 2012, now Pat. No. 8,897,302.
(Continued)

(51) Int. Cl.
*H04L 1/08* (2006.01)
*H04L 12/18* (2006.01)
(Continued)

(52) U.S. Cl.
CPC .............. *H04L 1/08* (2013.01); *H04L 12/18* (2013.01); *H04L 12/1863* (2013.01);
(Continued)

(58) Field of Classification Search
CPC ....... H04L 12/18; H04L 12/1863; H04L 1/08; H04L 43/0823; H04L 65/4084;
(Continued)

(56) References Cited

U.S. PATENT DOCUMENTS

| 5,408,470 A | 4/1995 | Rothrock |
| 5,740,367 A | 4/1998 | Spilo |

(Continued)

FOREIGN PATENT DOCUMENTS

| EP | 2536065 A2 | 12/2012 |
| WO | WO-2001/061886 A2 | 8/2001 |

(Continued)

OTHER PUBLICATIONS

Adamson et al.,"NACK-Oriented Reliable Multicast (NORM) Transport Protocol", RFC 5740, Nov. 2009, 95 pgs.
(Continued)

*Primary Examiner* — David Oveissi

(57) ABSTRACT

Methods, apparatuses, and systems for improving utilization of a communications system (e.g., a satellite communications system) are provided, using delayed reliability techniques as part of a multicast transport protocol. Embodiments may operate in a client-server context, in which the server-side of the communication link multicasts data to requesting users and to users where the data is being speculatively prepositioned. Requesting users may implement reliability checks to verify receipt of complete data in response to the request while user systems where data is being speculatively prepositioned may receive multicast reliability information in response to reliability requests from other users, but may not request replacement of missing or corrupted data themselves until a request is made for the data by that system.

25 Claims, 11 Drawing Sheets

Related U.S. Application Data

(60) Provisional application No. 61/496,901, filed on Jun. 14, 2011.

(51) Int. Cl.

| | | |
|---|---|---|
| *H04N 21/24* | (2011.01) | |
| *H04N 21/6375* | (2011.01) | |
| *H04N 21/6405* | (2011.01) | |
| *H04N 21/6408* | (2011.01) | |
| *H04N 21/6583* | (2011.01) | |
| *H04N 21/835* | (2011.01) | |
| *H04L 12/26* | (2006.01) | |
| *H04L 29/08* | (2006.01) | |
| *H04L 29/06* | (2006.01) | |

(52) U.S. Cl.
CPC ...... *H04L 43/0823* (2013.01); *H04L 65/4084* (2013.01); *H04L 67/1097* (2013.01); *H04N 21/2402* (2013.01); *H04N 21/6375* (2013.01); *H04N 21/6405* (2013.01); *H04N 21/6408* (2013.01); *H04N 21/6583* (2013.01); *H04N 21/835* (2013.01)

(58) Field of Classification Search
CPC ............ H04L 67/1097; H04N 21/6375; H04N 21/6405; H04N 21/6408; H04N 21/6583
See application file for complete search history.

(56) References Cited

U.S. PATENT DOCUMENTS

| | | |
|---|---|---|
| 5,870,754 A | 2/1999 | Dimitrova et al. |
| 5,905,981 A | 5/1999 | Lawler |
| 6,178,461 B1 | 1/2001 | Chan et al. |
| 6,182,133 B1 | 1/2001 | Horvitz |
| 6,339,787 B1 | 1/2002 | Yohe et al. |
| 6,701,316 B1 | 3/2004 | Li et al. |
| 6,757,283 B1 | 6/2004 | Yamanaka et al. |
| 6,865,655 B1 | 3/2005 | Andersen |
| 6,879,808 B1 | 4/2005 | Nations et al. |
| 7,023,818 B1 | 4/2006 | Elliott |
| 7,124,305 B2 | 10/2006 | Margolus et al. |
| 7,130,890 B1 | 10/2006 | Kumar et al. |
| 7,143,251 B1 | 11/2006 | Patterson |
| 7,340,510 B1 | 3/2008 | Liskov et al. |
| 7,359,956 B2 | 4/2008 | Kanai et al. |
| 7,376,150 B2 * | 5/2008 | Vedantham ......... H04L 12/1868 370/312 |
| 7,430,331 B2 | 9/2008 | Singh |
| 7,509,667 B1 | 3/2009 | Cook |
| 7,636,767 B2 | 12/2009 | Lev-Ran et al. |
| 7,680,897 B1 | 3/2010 | Carter et al. |
| 7,681,032 B2 | 3/2010 | Peled et al. |
| 7,716,367 B1 | 5/2010 | Leighton et al. |
| 7,778,438 B2 | 8/2010 | Malone |
| 7,814,149 B1 | 10/2010 | Stringham |
| 7,836,177 B2 | 11/2010 | Kasriel et al. |
| 7,917,531 B2 | 3/2011 | Sakurai et al. |
| 7,941,409 B2 | 5/2011 | Mimatsu |
| 7,953,881 B1 | 5/2011 | Vadlakonda et al. |
| 8,010,705 B1 | 8/2011 | Sebastian et al. |
| 8,041,677 B2 | 10/2011 | Sumner et al. |
| 8,055,616 B2 | 11/2011 | Johnston et al. |
| 8,082,228 B2 | 12/2011 | Mu |
| 8,151,004 B1 | 4/2012 | Ufimtsev et al. |
| 8,230,059 B1 | 7/2012 | Santos et al. |
| 8,230,461 B1 | 7/2012 | Ledermann et al. |
| 8,284,773 B1 | 10/2012 | Woleben et al. |
| 8,477,635 B2 | 7/2013 | Sebastian et al. |
| 8,489,672 B2 | 7/2013 | Sebastian et al. |
| 8,489,673 B2 | 7/2013 | Sebastian et al. |
| 8,639,744 B2 | 1/2014 | Sebastian |
| 8,671,223 B1 | 3/2014 | Sebastian et al. |
| 8,775,503 B2 | 7/2014 | Sebastian |
| 8,842,553 B2 | 9/2014 | Sebastian et al. |
| 8,897,302 B2 | 11/2014 | Sebastian |
| 9,137,568 B2 | 9/2015 | Sinha et al. |
| 9,172,748 B2 | 10/2015 | Sebastian |
| 9,363,308 B2 | 6/2016 | Sebastian et al. |
| 9,369,516 B2 | 6/2016 | Sebastian et al. |
| 9,407,355 B1 | 8/2016 | Lerner |
| 9,762,635 B2 | 9/2017 | Sebastian et al. |
| 2001/0016836 A1 | 8/2001 | Boccon-Gibod et al. |
| 2001/0043600 A1 | 11/2001 | Chatterjee et al. |
| 2002/0006116 A1 | 1/2002 | Burkhart |
| 2002/0026478 A1 | 2/2002 | Rodgers et al. |
| 2002/0129168 A1 | 9/2002 | Kanai et al. |
| 2002/0154887 A1 | 10/2002 | Lu |
| 2002/0188735 A1 | 12/2002 | Needham et al. |
| 2002/0194473 A1 | 12/2002 | Pope et al. |
| 2003/0018581 A1 | 1/2003 | Bratton et al. |
| 2003/0018878 A1 | 1/2003 | Dorward et al. |
| 2003/0050966 A1 | 3/2003 | Dutta et al. |
| 2004/0081199 A1 | 4/2004 | Lopez et al. |
| 2004/0205071 A1 | 10/2004 | Uesugi et al. |
| 2005/0010870 A1 | 1/2005 | Gu et al. |
| 2005/0033747 A1 | 2/2005 | Wittkotter |
| 2005/0131903 A1 | 6/2005 | Margolus et al. |
| 2005/0249231 A1 | 11/2005 | Khan |
| 2005/0289629 A1* | 12/2005 | Nadarajah .......... H04N 21/6131 725/115 |
| 2006/0064383 A1 | 3/2006 | Marking |
| 2006/0161625 A1 | 7/2006 | Norp et al. |
| 2006/0167969 A1 | 7/2006 | Andreev et al. |
| 2006/0184960 A1 | 8/2006 | Horton et al. |
| 2006/0253444 A1 | 11/2006 | O'Toole et al. |
| 2006/0277257 A1 | 12/2006 | Kromann et al. |
| 2006/0288072 A1 | 12/2006 | Knapp et al. |
| 2007/0033408 A1 | 2/2007 | Morten |
| 2007/0101074 A1 | 5/2007 | Patterson |
| 2007/0111713 A1 | 5/2007 | Silverbrook et al. |
| 2007/0116151 A1 | 5/2007 | Thesling |
| 2007/0133554 A1 | 6/2007 | Ederer et al. |
| 2007/0143484 A1 | 6/2007 | Drouet et al. |
| 2007/0174246 A1 | 7/2007 | Sigurdsson et al. |
| 2007/0220303 A1 | 9/2007 | Kimura et al. |
| 2007/0256021 A1 | 11/2007 | Prager et al. |
| 2007/0288518 A1 | 12/2007 | Crigler et al. |
| 2008/0005086 A1 | 1/2008 | Moore |
| 2008/0016201 A1 | 1/2008 | Thompson |
| 2008/0022135 A1 | 1/2008 | Gaya |
| 2008/0066182 A1 | 3/2008 | Hickmott et al. |
| 2008/0144713 A1 | 6/2008 | Kimmich et al. |
| 2008/0155614 A1 | 6/2008 | Cooper et al. |
| 2008/0175239 A1 | 7/2008 | Sistanizadeh et al. |
| 2008/0205396 A1 | 8/2008 | Dakshinamoorthy et al. |
| 2008/0235391 A1 | 9/2008 | Painter et al. |
| 2008/0235739 A1 | 9/2008 | Coebergh Van Den Braak |
| 2008/0256138 A1 | 10/2008 | Sim-Tang |
| 2008/0263130 A1 | 10/2008 | Michalowitz et al. |
| 2008/0320151 A1 | 12/2008 | McCanne et al. |
| 2009/0037393 A1 | 2/2009 | Fredricksen et al. |
| 2009/0049469 A1 | 2/2009 | Small et al. |
| 2009/0055471 A1 | 2/2009 | Kozat et al. |
| 2009/0055862 A1 | 2/2009 | Knoller et al. |
| 2009/0060086 A1 | 3/2009 | Kimmich et al. |
| 2009/0158318 A1 | 6/2009 | Levy |
| 2009/0168795 A1 | 7/2009 | Segel |
| 2009/0187673 A1 | 7/2009 | Ramjee et al. |
| 2009/0196296 A1 | 8/2009 | Vachuska |
| 2009/0234809 A1 | 9/2009 | Bluger et al. |
| 2009/0265516 A1 | 10/2009 | Prabhu et al. |
| 2009/0271528 A1 | 10/2009 | Gurevich et al. |
| 2009/0313329 A1 | 12/2009 | Agrawal et al. |
| 2009/0327505 A1 | 12/2009 | Rao et al. |
| 2010/0058430 A1 | 3/2010 | Jones et al. |
| 2010/0083322 A1 | 4/2010 | Rouse |
| 2010/0177642 A1 | 7/2010 | Sebastian et al. |
| 2010/0179984 A1 | 7/2010 | Sebastian |
| 2010/0179986 A1 | 7/2010 | Sebastian et al. |
| 2010/0179987 A1 | 7/2010 | Sebastian et al. |
| 2010/0180046 A1 | 7/2010 | Sebastian et al. |
| 2010/0185730 A1 | 7/2010 | Sebastian |

(56) References Cited

U.S. PATENT DOCUMENTS

| | | |
|---|---|---|
| 2010/0281105 A1 | 11/2010 | Sebastian |
| 2011/0140840 A1 | 6/2011 | Hardacker et al. |
| 2012/0039231 A1 | 2/2012 | Suri et al. |
| 2012/0060121 A1 | 3/2012 | Goldberg et al. |
| 2012/0072933 A1 | 3/2012 | Moore |
| 2012/0184309 A1 | 7/2012 | Cohen |
| 2013/0185387 A1 | 7/2013 | Gero |
| 2013/0282796 A1 | 10/2013 | Sebastian et al. |
| 2013/0282863 A1 | 10/2013 | Sebastian et al. |
| 2014/0029612 A1 | 1/2014 | Sebastian et al. |
| 2014/0040353 A1 | 2/2014 | Sebastian et al. |
| 2014/0193027 A1 | 7/2014 | Scherf et al. |
| 2015/0026241 A1 | 1/2015 | Sebastian |
| 2015/0032848 A1 | 1/2015 | Sebastian et al. |
| 2015/0127715 A1 | 5/2015 | Dankberg |

FOREIGN PATENT DOCUMENTS

| | | |
|---|---|---|
| WO | WO-2001/084777 A2 | 11/2001 |
| WO | WO-2002/041527 A1 | 5/2002 |
| WO | WO-2004/036362 A2 | 4/2004 |
| WO | WO-2007/051079 A2 | 5/2007 |
| WO | WO-2010/083214 A2 | 7/2010 |
| WO | WO-2010/083248 A2 | 7/2010 |

OTHER PUBLICATIONS

Adamson et al., "Negative-acknowledgment (NACK)-Oriented Reliable Multicast (NORM) Protocol", RFC 3940, Nov. 2004, 81 pgs.
Fonseca et al., BitTorrent Protocol—BTP/1.0, Version 1.0, Revision 1.33, Apr. 2005, DIKU, http://jonas.nitro.dk/bittorrent/bittorrent-rfc.html, 15 pgs.
Frantzeskou et al., "Effective Identification of Source Code Authors Using Byte-Level Information," ICSE '06, May 20-28, 2006, Shanghai, China, ACM 1-59593-085-X/06/0005, XP040040085, pp. 893-896.
Handley et al., "The Reliable Multicast Design Space for Bulk Data Transfer", RFC 2887, Aug. 2000, 22 pgs.
Paul et al., "Distributed caching with centralized control," Computer Communications, vol. 24, Issue 2, Feb. 1, 2001, pp. 256-268.
Selvakumar et al., "Implementation and comparison of distributed caching schemes," Computer Communications, vol. 24, Issues 7-8, Apr. 1, 2001, pp. 677-684.
International Search Report and Written Opinion mailed in International Application No. PCT/US2010/020897 dated Aug. 16, 2010, 15 pgs.
International Preliminary Report on Patentability mailed in International Application No. PCT/US2010/020897 dated Jul. 19, 2011, 10 pgs.
International Search Report and Written Opinion mailed in International Application No. PCT/US2010/020940 dated Sep. 22, 2010, 15 pgs.
International Preliminary Report on Patentability mailed in International Application No. PCT/US2010/020940 dated Jul. 19, 2011, 10 pgs.
Non-Final Office Action mailed in U.S. Appl. No. 12/651,909 dated Feb. 1, 2012, 22 pgs.
Applicant-Initiated Interview Summary mailed in U.S. Appl. No. 12/651,909 dated Apr. 16, 2012, 3 pgs.
Amendment and Response to Non-Final Office Action filed in U.S. Appl. No. 12/651,909 dated Apr. 27, 2012, 14 pgs.
Final Office Action mailed in U.S. Appl. No. 12/651,909 dated Jun. 22, 2012, 19 pgs.
Notice of Appeal and Pre-Appeal Brief Request for Review filed in U.S. Appl. No. 12/651,909 dated Aug. 21, 2012, 6 pgs.
Notice of Panel Decision from Pre-Appeal Brief Review mailed in U.S. Appl. No. 12/651,909 dated Sep. 28, 2012, 2 pgs.
Appeal Brief filed in U.S. Appl. No. 12/651,909 dated Nov. 27, 2012, 28 pgs.
Examiner's Answer to Appeal Brief mailed in U.S. Appl. No. 12/651,909 dated Jan. 31, 2013, 12 pgs.
Reply Brief filed in U.S. Appl. No. 12/651,909 dated Mar. 29, 2013, 3 pgs.
Patent Trial and Appeal Board Docketing Notice mailed in U.S. Appl. No. 12/651,909 on Apr. 17, 2013, Appeal No. 2013-006223, 2 pgs.
Decision on Appeal mailed in U.S. Appl. No. 12/651,909 on Jul. 30, 2015, Appeal No. 2013-006223, 20 pgs.
Notice of Allowance mailed in U.S. Appl. No. 12/651,909 dated Oct. 15, 2015, 8 pgs.
Non-Final Office Action mailed in U.S. Appl. No. 14/453,479 dated Mar. 13, 2015, 7 pgs.
Notice of Allowance mailed in U.S. Appl. No. 14/453,479 dated Sep. 14, 2015, 7 pgs.
Non-Final Office Action mailed in U.S. Appl. No. 14/070,977 dated Oct. 8, 2015, 24 pgs.
Non-Final Office Action mailed in U.S. Appl. No. 14/046,781 dated Nov. 16, 2015, 29 pgs.
Extended European Search Report mailed in European Patent Application No. 12171996.7 dated Feb. 2, 2015, 8 pgs.
Final Office Action mailed in U.S. Appl. No. 14/070,977 dated Feb. 23, 2016, 28 pgs.
Notice of Allowance mailed in U.S. Appl. No. 14/453,479 dated Jan. 21, 2016, 8 pgs.
Notice of Allowance mailed in U.S. Appl. No. 12/651,909 dated Feb. 5, 2016, 8 pgs.
Final Office Action mailed in U.S. Appl. No. 14/046,781 dated Jun. 20, 2016, 26 pgs.
Advisory Action mailed in U.S. Appl. No. 14/070,977 dated May 5, 2016, 3 pgs.
Non-Final Office Action mailed in U.S. Appl. No. 14/070,977 dated Jul. 18, 2016, 28 pgs.
Final Office Action mailed in U.S. Appl. No. 14/070,977 dated Jan. 27, 2017, 22 pgs.
Non-Final Office Action mailed in U.S. Appl. No. 13/919,861 dated Oct. 6, 2016, 18 pgs.
Non-Final Office Action mailed in U.S. Appl. No. 13/919,888 dated Oct. 7, 2016, 20 pgs.
Non-Final Office Action mailed in U.S. Appl. No. 14/046,781 dated Aug. 24, 2017, 24 pgs.
Non-Final Office Action mailed in U.S. Appl. No. 13/919,888 dated Aug. 28, 2017, 22 pgs.
Final Office Action mailed in U.S. Appl. No. 13/919,888 dated May 5, 2017, 24 pgs.
Notice of Allowance mailed in U.S. Appl. No. 13/919,861 dated May 15, 2017, 19 pgs.
Advisory Action mailed in U.S. Appl. No. 13/919,888 dated Jul. 28, 2017, 4 pgs.

\* cited by examiner

TRANSPORT PROTOCOL FOR ANTICIPATORY CONTENT

CROSS-REFERENCE TO RELATED APPLICATIONS

This application is a continuation of U.S. patent application Ser. No. 13/517,860, entitled "Transport Protocol for Anticipatory Content", filed Jun. 14, 2012, which is a non-provisional application of U.S. Provisional Patent Application No. 61/496,901, filed Jun. 14, 2011, entitled "Transport Protocol for Anticipatory Content", both of which are incorporated by reference herein in their entirety for all purposes.

BACKGROUND

This disclosure relates in general to communications and, but not by way of limitation, to reliability within a transport protocol for use in a system with a multicast communications system.

In some topologies of communications systems, groups of users share some or all of the forward and reverse link. For example, in some satellite communications systems, users share spot beams for communicating with a service provider (e.g., via a base station and/or gateway). In some cable communication systems, users share bandwidth on portions of the communication system near or at the user or home connection. Communication services provided to the users over the shared forward link and corresponding reverse links may be affected by a number of factors, including bandwidth and other link conditions. For example, because all users sharing the forward link also share the link's bandwidth, any unnecessary redundancies in communications may cause sub-optimal utilization of the forward link. Similarly, in many systems all users sharing the forward link also share a reverse link that may be used for reliability and error control, thus any unnecessary redundancies in communication, reliability, and error control may also cause sub-optimal usage of the reverse link.

Efficient bandwidth utilization is beneficial in a reverse link when it is not possible to efficiently multicast in the reverse direction. For example, where content is being multicast from a single content source to 1000 users, the reverse link from 1000 users to the single content source may regularly include duplicate information. Some methods of more efficient use of a reverse channel are known. For example, designating hierarchies of users that communicate with each other before using the reverse channel in order to identify redundancies is one example of improving efficiency of a reverse channel. Other methods for improving efficiency use back off timers to delay use of a reverse channel at some users to see if a response to the users request is multicast based on a request from a second user before the first user sends the request.

Use of negative acknowledgement (NACK) for error checking and reliability is another way to reduce use of a reverse channel in multicasting, especially when combined with the other techniques mentioned above. NACK oriented reliable multicast (NORM) protocol uses negative acknowledgment to institute reliability standards in a multicast environment. NORM and all of the methods used above include scaling limitations. Such methods may decrease use of a reverse channel, but reverse channel usage still remains a limiting factor in certain multicast environments.

SUMMARY

Methods, apparatuses, and systems for improving utilization of a communications system (e.g., a satellite communications system) are provided, using delayed reliability techniques as part of a multicast transport protocol.

In one set of embodiments, a method is provided for multicasting over a communications system having a communications path between a server side of the communications system and a client side of the communications system, the communications path comprising a shared forward link over which bandwidth resources are shared. The method may involve observing, at a server, a response to a first request for an object from a first user system. After the response is observed and the object identified, the object is multicast over the communications path to the first user system and a second user system. The first user system is the requesting system, and the second system is a system where the object is to be speculatively prepositioned in anticipation of a future request for the object by the second system.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1A:
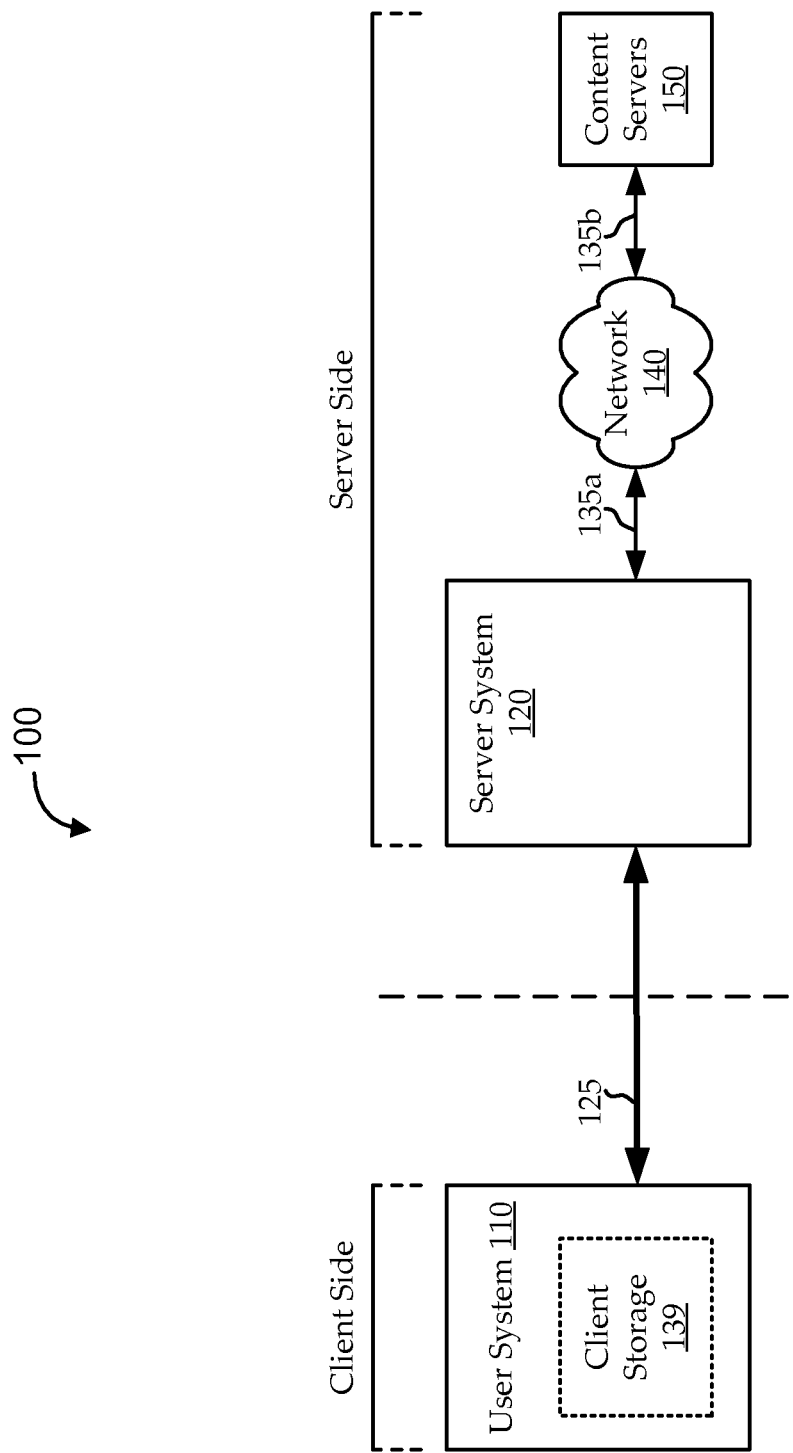
FIG. 1A shows a simplified block diagram of one aspect of an embodiment of a multicast communications system for use with various embodiments of the innovations presented herein.

In the appended figures, similar components and/or features may have the same reference label. Further, various components of the same type may be distinguished by following the reference label by a dash and a second label or a letter label in conjunction with a number label that distinguishes among the similar components. If only the first reference label is used in the specification, the description is applicable to any one of the similar components having the same first reference label irrespective of the second reference label or letter associated with the first reverence label.

DETAILED DESCRIPTION

Embodiments of the invention disclosed herein include a multicast transport protocol with delayed reliability for prospectively placed objects. In one potential non-limiting implementation example, a first user system requests an object through a system using a multicast transport protocol. The communication system determines that the object should be communicated to the first user system via a multicast connection, which enables the object to be placed on a second user system in anticipation that the object will later be requested by the second user system. Because the first user system has selected the object, the copy multicast to the first user system is checked for errors, and any missing or corrupted portions are replaced in order to provide the first user system with a full copy of the object. In order to avoid overwhelming the reverse channel with error requests, the second system accepts the multicast copy of the file, but may not send any requests to replace mission or corrupted portions of the file. At a later point in time, generally after the second user system has requested the object, any missing or corrupted portions of the object received at the second user system will be fixed to provide the second system with a full copy of the object.

The ensuing description provides various embodiment, and is not intended to limit the scope, applicability, or configuration of the disclosure. Rather, the ensuing description of the embodiments will provide those skilled in the art with an enabling description for implementing certain embodiments. It is to be understood that various changes may be made in the function and arrangement of elements without departing from the spirit and scope as set forth in the appended claims.

Advantages from embodiments of the system may include allowing greater scalability in a multicast transport. Under certain circumstances, such as a lossy connection or suboptimal weather in a satellite link, reliability checks on a reverse channel may overwhelm the reverse channel because of the one to many nature of multicasting. Aspects of the present innovations may be implemented in conjunction with other techniques for reducing reverse channel usage in order to further enable additional numbers on the receiving side of the multicast communications channel where the reverse channel bandwidth may be a limiting factor. As part of this, aspects of the present innovations may further enable a greater frequency of prefetching or prospective placement of files where the reverse channel may be a limiting factor, especially in systems such as satellite communications where a spot beam size has a potential for very large numbers of receivers.

I. Multicast Communications System with a Multicast Transport Protocol Including Delayed Reliability Referring first to FIG. 1A, a simplified block diagram is shown of one embodiment of a communications system 100 for use with various embodiments, with communication between a single user system 110 and a content server 150. The communications system 100 facilitates communications between a user system 110 and a content server 150 via a server system 120 and a network 140. The server system 120 may be configured to effectively provide communication between the user system 110 which is on a client side of system 100 and the content server 150, which is on a server side of system 100. User system 110 may include client storage 139, which may be used to store files, requested objects, and other requested data, and which may further be configured to store data that may be speculatively prepositioned at user system 100 in anticipation of a future request. In certain embodiments, a server system 120 may be configured in conjunction with user system 110 to provide specialized communications functionality that will be described more with respect to FIGS. 2-5.

In certain embodiments, the functionality described for server system 120 may be integrated into the functionality of content servers 150. In other alternative embodiments, communication system 100 may include an optimizer system (e.g., a server system optimizer and a user system optimizer) that can be implemented in a number of ways without departing from the scope of the invention. In some embodiments, the optimizer may be implemented as a proxy system, such that the server system 120 may include proxy server and the user system 110 may include a proxy client.

Figure 1B:
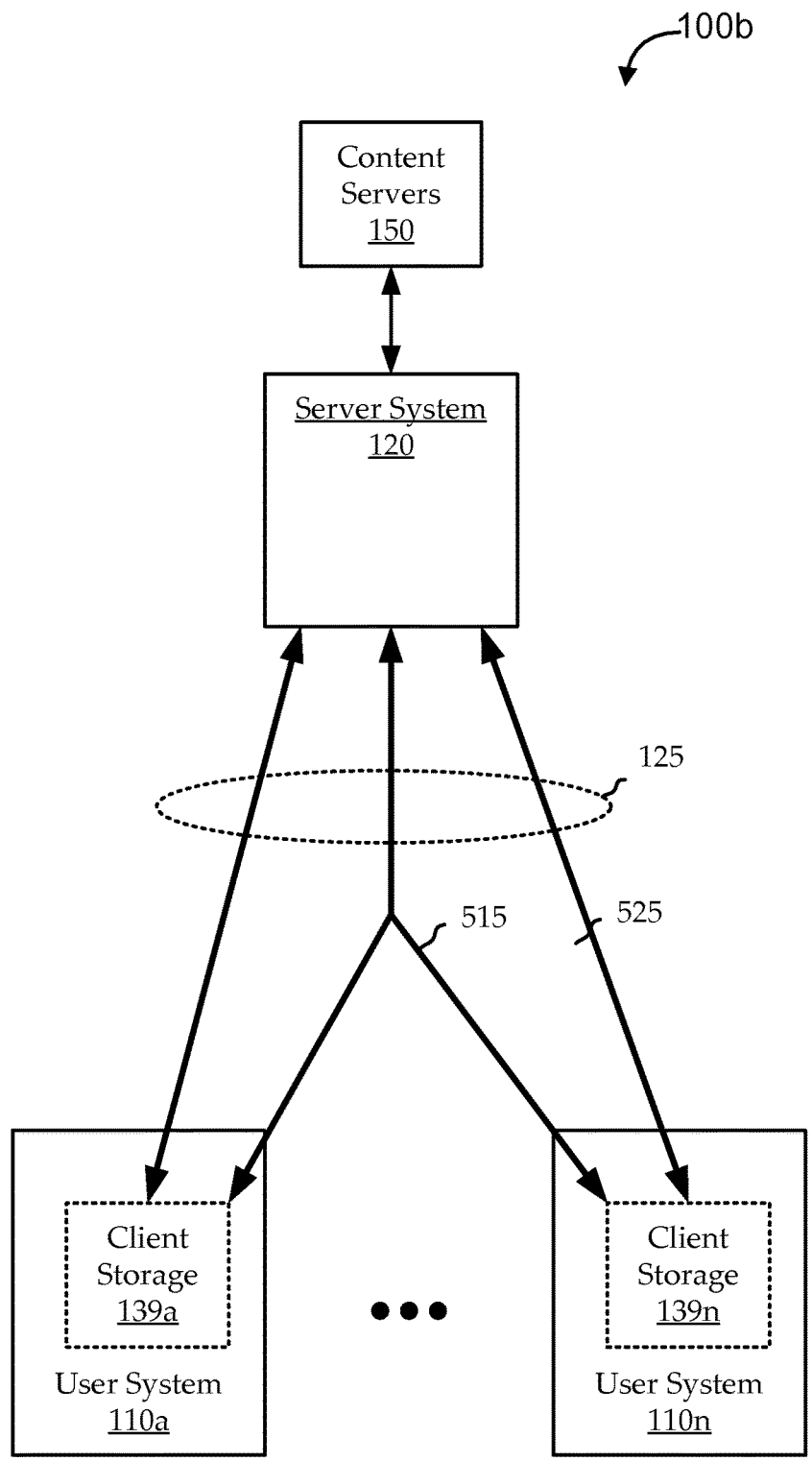
FIG. 1B shows a simplified block diagram of another embodiment of a multicast communications system for use with various embodiments of the innovations presented herein.

FIG. 1B shows a simplified block diagram of communications system 100 having multiple user systems 110a through 110n for use with various embodiments. The communications system 100 facilitates communications between content server 150 using a server system 120 and multiple user systems 110 as well as client-server communication link 125 between the server system 120 and the client systems 110a-110n. The client-server communication link 125 supports one or more unicast service flows 525 and one or more multicast service flows 515 for supporting unicast and multicast traffic, respectively. In one embodiment, the client-server communication link 125 may include a satellite communications link. It will be appreciated that satellites may effectively broadcast all their downstream traffic to all receivers that are tuned to a particular carrier, beam, etc. As such, unicasting or multicasting to one or more user systems 110 may, in fact, involve broadcasting the data over the satellite link and also broadcasting control data to direct receivers to either accept or ignore relevant portions of the broadcast data. Notably, while some system resources may be expended in setting up a multicast service flow 515 and in related logistics, it "costs" the satellite communications system substantially the same bandwidth resources to send a packet to one user system 110 or to all user systems 110 (e.g., on a particular spot beam). The same is not true, however, for messages from all user systems 110 back to a satellite communication system. In this reverse channel from each user system, every additional message "costs" the same as the first message, such that the same message from three users in the reverse channel "costs" roughly three times what a single message "costs".

Similarly, in another embodiment, the client-server communication link 125 may include a cable communications link. For example, a cable company may run a cable line to a neighborhood aggregator, from which individual coaxial lines communicate last mile traffic to individual households. Each individual coaxial cable may carry all the traffic for the entire neighborhood, even where some of that traffic is destined only for particular households. As in the satellite embodiment described above, since all the cable subscriber households in the same neighborhood effectively receive all the traffic, bandwidth resources can be shared by multicasting traffic, where appropriate. Of course, satellite and cable networks are only two illustrative embodiments of client-server communication links 125. Embodiments of the client-server communication link 125 can include any type of communications link that may have limited bandwidth resources, where the bandwidth resources can be at least partially shared through multicasting.

Each user system 110 of FIG. 1B may include client storage 139, so that user system 110a may have client storage 139a, and user system 110n may have client storage 139n. Each client storage 139, may be used to store files, requested objects, and other requested data, and which may further be configured to store data that is speculatively prepositioned at user system 100 in anticipation of a future request. In certain alternative embodiments, user systems 110 may share client storage 139 or portions of client storage 139. User systems 110 may alternatively be arranged in a hierarchical structure such that one user system communicates with content server 150 via another user system, and may access client storage 139 of the intermediate user system.

Figure 1C:
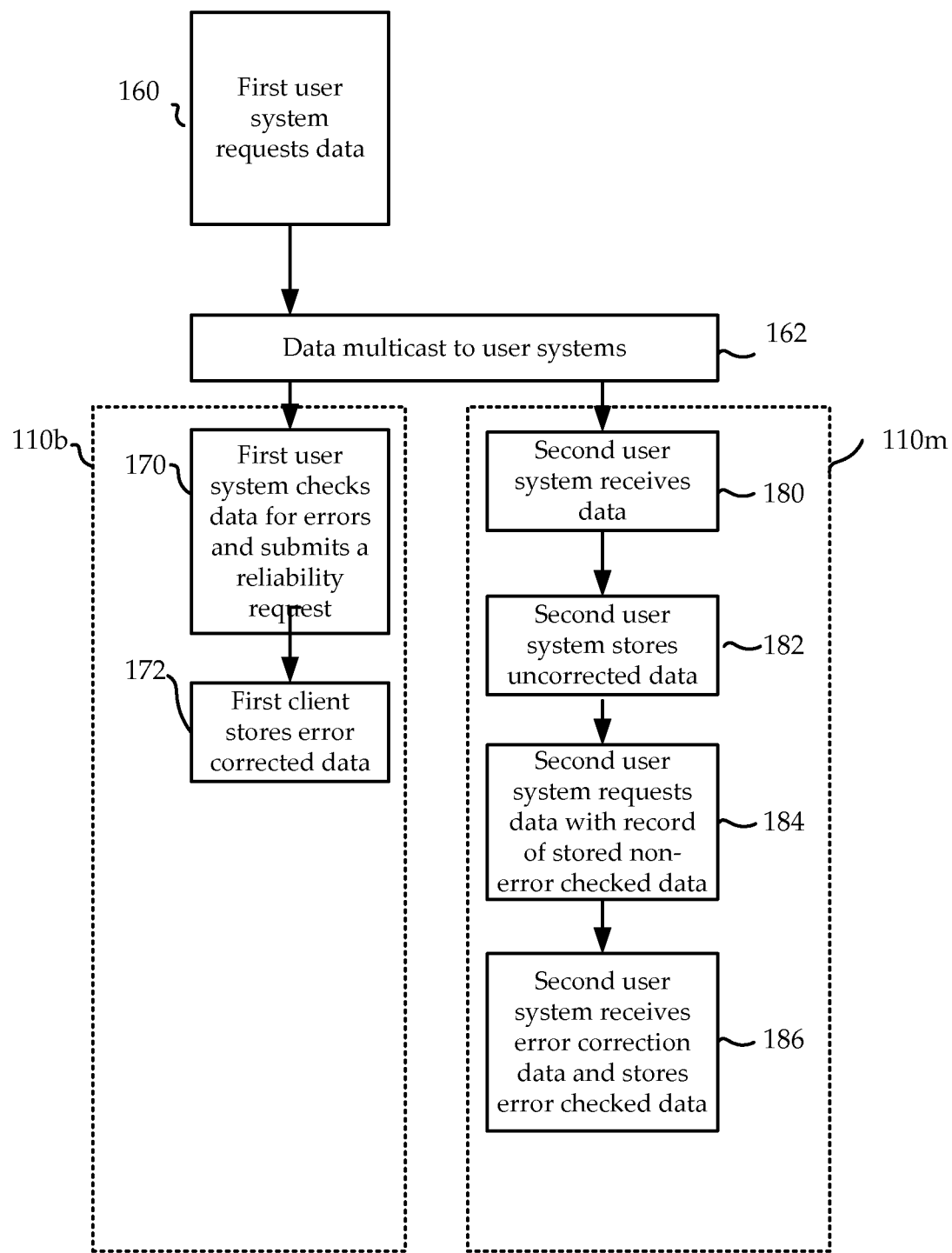
FIG. 1C shows a flow diagram of an illustrative method for using an embodiment of the innovations herein to handle multicast traffic reliability over a communications system.

FIG. 1C describes a simplified flowchart detailing one potential embodiment of a multicast transport protocol including delayed reliability. For illustrative purposes, the steps detailed in FIG. 1C are described below as being implemented using the systems described in FIGS. 1A and 1B. The steps of FIG. 1C may alternatively be implemented using other systems including systems including additional content servers, multiple levels of clients in a hierarchical structure, additional devices disposed between a content server any one or more users, or any other acceptable configuration that may include a multicast channel between a content server and a plurality of users.

In the first step of FIG. 1C, step 160, a first user system 110b requests data or an object from a content server 150. In response to the request, the requested data may be multicast to multiple user systems in step 162 over a shared forward link. At least two user systems receive the multicast data in FIG. 1C, a first user system 110b and a second user system 110m. When the first user system 110b, which is the system that requested the data, receives the multicast data, the first user system 110b checks the data for errors and submits a reliability request or reliability message in step 170. The reliability message may be communicated to server system 120 or to content servers 150. This message from the first user system 110b may be in the form of an acknowledgment that the data or portions of the data such as individual packets or blocks have been successfully received without error. This request may alternatively be in the form of a negative acknowledgement such that a request may be sent only when an error or omission is detected in the data or a portion of the data. Following the error check, the first client stores error checked data in step 172.

In parallel to steps 170 and 172 related to the first user system 110b, a second user system 110m is speculatively prepositioning the user data from the first user system 110b to enable a more efficient response to a potential future request for the data from the second user system. Various systems and methods for selecting data for speculatively prepositioning data include a history of previous selections by the second user system, similar selections by similar user systems, or simply because the data is being multicast and the second user system may have available resources and allocated memory storage available to store the data in a client storage 139. Alternatively, the second user system 110m may have a full client storage 139, but may determine that the use of the data may be more likely that currently stored data, and may delete the currently stored data to make space for the data being multicast in response to the request by the first user system 110b.

In step 180, the second user system 110m receives the data, and in step 182, the second user system 110m stores the uncorrected data. The second user system 110m may identify missing or corrupted portions of the data at this point, or may simply store the received data without checking for errors. The second user system 110m may additionally continue monitoring incoming channels for a first object repair message that is being multicast in response to a reliability request from the first user system.

In certain embodiments, he second user system 110m may not, however, initiate use of the reverse channel for a reliability request until the data is actually requested by the second user system. Such a request, made by a program or user input to the second user system 110m occurs in step 184. When the request occurs, the second user system 110m may send a reliability request indicating that the prepositioned data has errors and identifying the missing or corrupted portions of the data. The reliability request may be the initial communication from the second user system 110m, or may be a follow up communication after a standard data request is made similar to the data request in step 160. Finally, in step 186, the second user system 110m receives error correction data as part of a second object repair message and integrates that data with the uncorrected data file to create a fully error checked object that may be used by the second user system.

In alternative embodiments, rather than creating a full error checked data file that may be used as the requested object, the second user system 110m may use the error checked data file for highly efficient compression that may enable a download of the file after the request for the object is made by the second user system 110m in a highly efficient manner as described in more detail below.

Additionally, as mentioned above, the object is speculatively prepositioned at the second user system 110m, but the second user system 110m may not initiate a request for the object or an object repair message until a user of the second user system 110m actually requests the object. During a delay that may occur between the speculative prepositioning and the request for the object at the second user system 110m, various alternative embodiments may function to deal with the speculatively positioned object in different ways. A second user system 110m may or may not continue observing the forward link for multicast object repair messages, and may or may not use computing resources to analyze the speculatively placed object for errors prior to the user request for the object. In one potential embodiment, a system may analyze the speculatively placed object, identify errors, and create a negative acknowledgement message that is ready to communicate as soon as the user requests the object. In further similar embodiments, such a negative acknowledgement message may be updated if part of the errors are corrected by a multicast data repair message, or discarded if all of the errors are corrected by such a message. In further alternative embodiments, an error check may occur at the time a user requests the speculatively prepositioned content, a request for content may be sent to a content server merely for accounting purposes at the content server, and an object repair message to the user of the second user system 110m may simply be a message verifying that the object is current or "fresh" and appropriate for use in response to the user's request. In other embodiments, second user system 110m may monitor or receive message from a monitoring system providing information relating to bandwidth availability in a reverse channel, and may communicate object repair messages based on bandwidth availability

II. Multicast Communications System with an Optimizer

Figure 2:
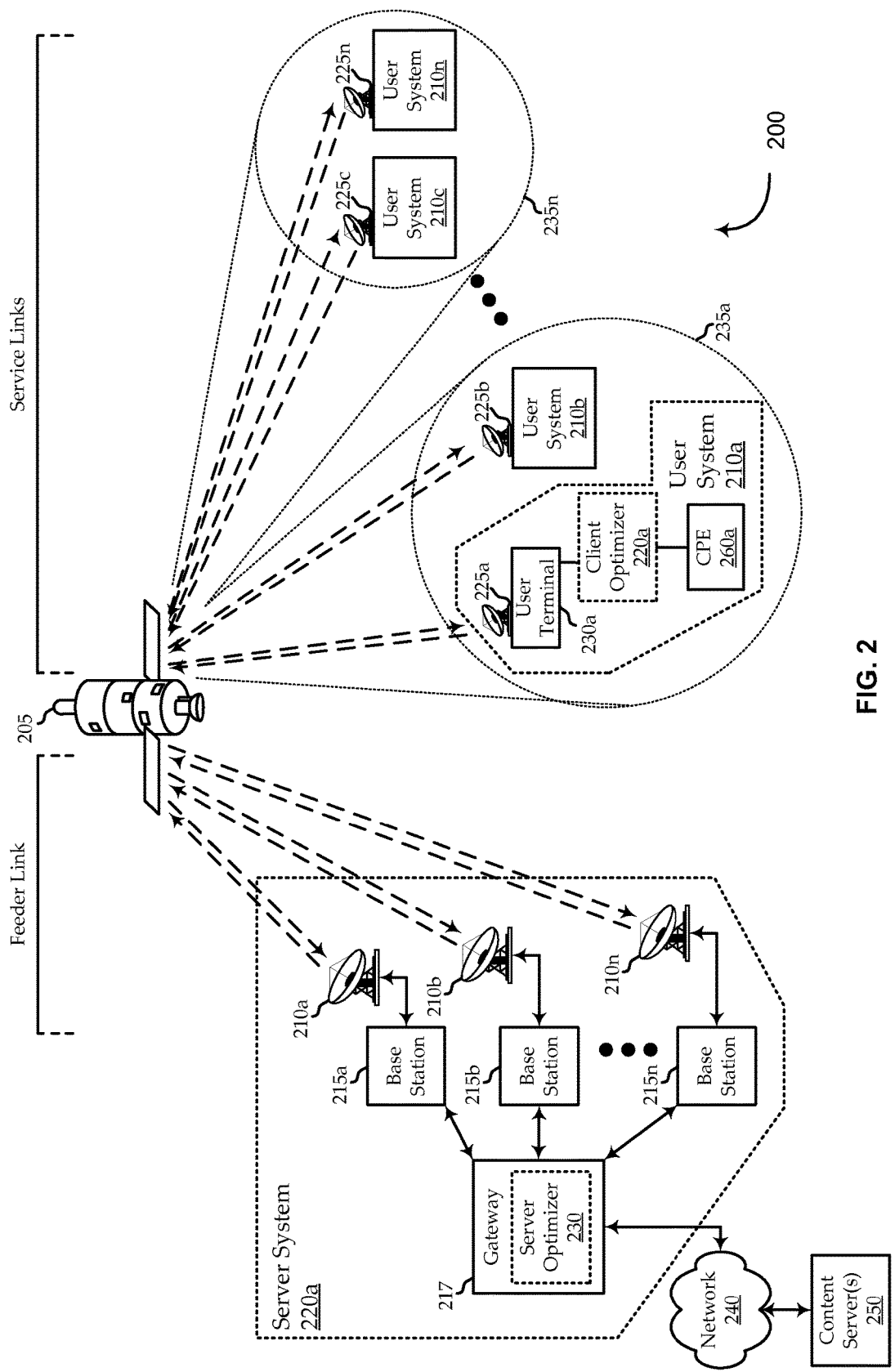
FIG. 2 shows a block diagram of an embodiment of a satellite communications system having a server system in communication with multiple user systems via a satellite over multiple spot beams, according to various embodiments of the innovations presented herein.

FIG. 2 shows a block diagram of an embodiment of a satellite communications system 200 having a server system 220 in communication with multiple user systems 110 via a satellite 205 over multiple spot beams 235, according to various embodiments. The server system 220 may include any server components, including base stations 215, gateways 217. Satellite communications system 200 may include not only a standard communication path from user systems to a content server, but also may include at least one server optimizer 230 and at least one client optimizer 220, and may include specialized functionality, as mentioned above. This specialized functionality may serve not only to allow extremely high compression on the forward link, but also in the reverse link when acknowledgment, negative acknowledgement, or other reliability messages are sent from a user system in response to received objects. This may enable extremely efficient use of a reverse channel when used in conjunction with delayed reliability for speculatively prepositioned multicast data.

Embodiments of the optimizer (e.g., the server optimizer 230 and the client optimizer 220) can be implemented in a number of ways without departing from the scope of the invention. In some embodiments, the optimizer may be implemented as a proxy, such that the server optimizer 230 is a proxy server and the client optimizer 220 is a proxy client. For example, a transparent intercept proxy can be used to intercept traffic in a way that is substantially transparent to users at the client-side of the proxy tunnel. In other embodiments, the optimizer may be implemented as an in-line optimizer. For example, the client optimizer 220 is implemented within a user terminal and the server optimizer 230 is implemented within a provider terminal (e.g., a satellite base station or gateway, a cable head-end, a digital subscriber line access multiplexer (DSLAM), etc.). Other configurations are possible in other embodiments. For example, embodiments of the server optimizer 230 are implemented in the Internet cloud (e.g., on commercial network leased server space). Embodiments of the client optimizer 220 are implemented within a user's personal computer, within a user's modem, in a physically separate component at the customer premises, etc.

It is worth noting that references herein to "intercepting" data should be construed broadly to include any useful slowing, sampling, re-routing, and/or other techniques that allow processing of the data as required according to various embodiments. In some embodiments, traffic passes through the server optimizer 230, where it is "intercepted" by being buffered for analysis and processing. For example, the buffering may be used to slow and accumulate traffic for fingerprint generation and analysis, as described more fully below. Notably, certain embodiments described as using an optimizer component (e.g., the server optimizer 230) to intercept the traffic may actually be implemented by having a different component intercept the traffic, from which the optimizer component may receive the intercepted traffic for processing.

Embodiments of the user system 110 may include any component or components for providing a user with network interactivity. For example, the user system 110 may include any type of computational device, network interface device, communications device, or other device for communicating data to and from the user. Typically, the communications system 100a facilitates communications between multiple user systems 110 and a variety of content servers 150 over one or more networks 140 (only one of each is shown in FIG. 1A for the sake of clarity). The content servers 150 are in communication with the server optimizer 230 via one or more networks 140. The network 140 may be any type of network 140 and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of network 140 supporting data communication between devices described herein, in different embodiments. The network 140 may also include both wired and wireless connections, including optical links.

As used herein, "content server(s)" is intended broadly to include any source of content in which the users may be interested. For example, a content server 150 may provide website content, television content, file sharing, multimedia serving, voice-over-Internet-protocol (VoIP) handling, and/or any other useful content. It is worth noting that, in some embodiments, the content servers 150 are in direct communication with the server optimizer 230 (e.g., not through the network 140). For example, the server optimizer 230 may be located in a gateway that may include a content or application server. As such, discussions of embodiments herein with respect to communications with content servers 150 over the network 140 are intended only to be illustrative, and should not be construed as limiting.

In some embodiments, when the user system 110 communicates with the content server 150, the server optimizer 230 intercepts the communications for one or more purposes. As described below, the server optimizer 230 may be part of a server system 220 that may include components for server-side communications (e.g., base stations, gateways, satellite modem termination systems (SMTSs), digital subscriber line access multiplexers (DSLAMs), etc., as described below with reference to FIG. 2). The server optimizer 230 may act as a transparent and/or intercepting proxy. For example, the client optimizer 220 is in communication with the server optimizer 230 over a client-server communication link 125, and the server optimizer 230 is in communication with the content server 150 over a content network link 135. The server optimizer 230 may act as a transparent man-in-the-middle to intercept the data as it passes between the client-server communication link 125 and the content network link 135. Some purposes of the interception may include filtering, caching, parsing, and/or otherwise processing the requests and responses. For example, when the user system 110 requests a web object from a content server 150, the server optimizer 230 may intercept and parse the request to implement prefetching and/or other types of functionality.

As described more fully below, embodiments of the server optimizer 230 use various techniques (e.g., dictionary coding) to identify redundancies between incoming data and data previously sent across the links of the communication system 100a (e.g., the client-server communication link 125 and the content network link 135). In particular, various techniques (e.g. delta coding, wide dictionary coding, etc.) may allow identification of redundancies in byte sequences traversing the links even when a large history is maintained. These techniques may be used to identify and exploit opportunities for multicasting to increase utilization of the communications links. Use of these techniques to identify and exploit these multicast opportunities may be referred to herein as "deltacasting."

It will be appreciated that "delta coding," "dictionary coding," "dictionary," "deltacasting," and other similar terms and phrases are intended to be broadly construed to include use of any type of dictionary-like structure for optimization. Embodiments of the dictionary include chunks of content data (e.g., implemented as delta dictionaries, wide dictionaries, byte caches, and/or other types of dictionary structures). For example, when content data is stored in the dictionary, some or all of the blocks of data defining the content are stored in the dictionary in an unordered, but indexed way. As such, content may not be directly accessible from the dictionary; rather, the set of indexes may be needed to recreate the content from the set of unordered blocks.

It is worth noting that data may be communicated over a communications system 100*a* using one or more protocols that define, among other things, the format for the datagrams (e.g., packets, frames, etc.). Each datagram may typically include a header portion and a content portion. As used herein, the term "header" is intended broadly to include any portions of the datagram other than those used to communicate the actual content (e.g., file data), and is not intended to be limited to any particular datagram format. For example, an Internet protocol (IP) packet may include a header at the beginning of each packet, while other types of datagrams may provide header-types of information in other ways (e.g., using preambles, post-ambles, mid-ambles, spread-ambles, sub-frames, separate signaling or control data, etc.). These header portions may include information, such as source address, destination address, priority, packet length, coding information, modulation information, etc. Of course, those of skill in the art will appreciate that similar categories of header-portion and content-portion information may be found within datagrams of other protocol formats (e.g., HTTP, FTP, etc.).

Much can be gleaned from the header portions of data. For example, the header portion may include metadata or other information about the content portion that can be used to help characterize the content portion of the data. In fact, this technique may be used by certain types of content delivery systems, like a video-on-demand (VOD) system. A VOD system may include an application running at a VOD content server and/or at the end viewer's customer premises equipment (CPE) (e.g., on a set-top box) for parsing and translating proprietary metadata from packet headers of user requests. Notably, while use of the metadata may provide relatively straightforward knowledge of the content being requested, using proprietary tags in this way may require having access to (e.g., and running an application on) the content server.

For example, a parsed URL may look as follows: "http://www.VOD.com/movieplayer?70AX05nkd4868PR1D5g." The illustrative URL may include a string of characters generated as part of a proprietary application function, and may be decoded by the VOD server application to identify information, including the particular download requested, an identifier for the session, user or account data, shopping cart data, client playback capabilities, etc. As such, another request for the same VOD movie, even from the same content server, may have different URLs (e.g., different request headers). While the VOD application server may be able to understand the requests as being for the same movie (e.g., the VOD applications server will understand which bytes specify the content), a transparent intercept proxy, like that of embodiments of the server optimizer 230, may not be able to determine this from the metadata alone.

Embodiments of the server optimizer 230 generate fingerprints (e.g., fingerprints, digests, signatures, hash functions, etc.) from the content portion of the data traversing the communication links. The server optimizer 230 intercepts and analyzes the byte-level data of the content portion in a way that may be substantially transparent to the user. Embodiments of the fingerprints are generated so as to be useful in identifying redundancies between the incoming intercepted data and previously processed data. For example, hashing functions are applied to traffic, after being intercepted by the server optimizer 230, for use as identifiers (e.g., "weak" identifiers) that are at least strong enough to identify candidate matches with blocks stored in a dictionary. Some embodiments of the fingerprints are generated so as to be useful further as strong identifiers for representing substantially identical matching blocks stored in a dictionary.

A number of difficulties arise from implementing this type of optimizer to use fingerprints (e.g., rather than metadata or other header information). In one example, as described above, header data (e.g., particularly proprietary metadata) may be used to make a number of determinations (e.g., precisely what object file is being requested) that may be difficult or impossible to make from the content data alone. In another example, proprietary data or limited content environments may allow certain assumptions to be made. For example, when someone requests a VOD movie, the server may know exactly what bytes are being requested (e.g., whatever bytes are associated with that particular movie file on the VOD server), how large the file is, that the viewer may be likely to watch the movie sequentially, where the movie is stored, etc. However, by using the content portion of the data to generate fingerprints, embodiments of the server optimizer 230 are relatively agnostic to the content being analyzed, which may provide certain functionality even where the server optimizer 230 may have little or no access to proprietary metadata and/or other header information.

In some embodiments, for example, the server optimizer 230 generates fingerprints of data being received over the content network link 135 in response to various requests from different users on a shared spot beam of a satellite communications system (e.g., where the requests are fulfilled by the server optimizer 230 over the client-server link 125 of the communications system 100*a*). The server optimizer 230 determines from the fingerprints that multiple users are requesting the same content at substantially the same time. In response, the server optimizer 230 creates a multicast service flow (e.g., on the client-server link 125) over which it multicasts the requested data to all the requesting users, thereby saving bandwidth relative to unicasting multiple copies of the content to the multiple users.

It is worth noting that embodiments of the client-server communication link 125 (e.g., between the client optimizer 220 and the server optimizer 230) and the content network link 135 (e.g., between the server optimizer 230 and the content servers 150 via the networks 140) can be implemented as various types of links have different and/or changing link characteristics, including, for example, differences in bandwidth, latency, cost per bit, etc. For example, while certain embodiments are described in the context of a satellite communications system, where the client-server communication link 125 may include at least one satellite link, other topologies and link types are possible.

It will now be appreciated that embodiments of the client-server communication link 125 effectively provides transparent acceleration functionality to the user systems 110. This functionality will be described in more detail with respect to illustrative systems in FIGS. 2-5.

III. Multicast Communications System with an Optimizer and a Multicast Transport Protocol Including Delayed Reliability As discussed above, FIG. 2 shows a block diagram of an embodiment of a satellite communications system 200 having a server system 220 in communication with multiple user systems 110 via a satellite 205 over multiple spot beams 235, according to various embodiments. The server system 220 may include any server components, including base stations 215, gateways 217, and other components. A base station 215 may be sometimes referred to as a hub or ground station. In certain embodiments, as described below, the base station 215 has functionality that may be the same or different from a gateway 217. For example, as illustrated, a gateway 217 provides an interface between the network 140 and the satellite 205 via a number of base stations 215. Various embodiments provide different types of interfaces between the gateways 217 and base stations 215. For example, the gateways 217 and base stations 215 may be in communication over leased high-bandwidth lines (e.g., raw Ethernet), a virtual private large-area network service (VPLS), an Internet protocol virtual private network (IP VPN), or any other public or private, wired or wireless network. Embodiments of the server system 220 are in communication with one or more content servers 150 via one or more networks 140.

In some embodiments, the gateway 217 may be configured to implement relatively simple routing functions. For example, the gateway 217 may receive traffic from the network 140, determine which of the base stations 215 should receive the traffic, and route the traffic accordingly. In other embodiments, the gateway 217 performs relatively complex functions, including, for example, network security, accounting, content acceleration, trend analysis, signal processing and/or encoding, etc. In still other embodiments, the gateway 217 and the base stations 215 share some or all of the desired network functionality. For example, it may be desirable to perform certain functions in one location, perform other functions in a distributed manner, and perform still other functions in a redundant manner.

As traffic traverses the satellite communications system 200 in multiple directions, the gateway 217 may be configured to implement multi-directional communications functionality. For example, the gateway 217 may send data to and receive data from the base stations 215. Similarly, the gateway 217 may be configured to receive data and information directed to one or more user systems 110, and format the data and information for delivery to the respective destination device via the satellite 205; or receive signals from the satellite 205 (e.g., from one or more user systems 110) directed to a destination in the network 140, and process the received signals for transmission through the network 140.

In one embodiment, the satellite communications system 200 may include a number of gateways 217 distributed over a large geographic region. Each gateway 217 may be in communication with the network 140 via a high-speed connection (e.g., a dedicated high-bandwidth fiber link). Each gateway 217 may also be in communication with, and handles communications for, up to twenty base stations 215 (e.g., twenty feeder links). Each of the twenty base stations 215 is configured to service up to four user links by communicating content for those user links to the satellite 205 using an antenna 210.

In various embodiments, one or more of the satellite links are capable of communicating using one or more communication schemes. In various embodiments, the communication schemes may be the same or different for different links. The communication schemes may include different types of coding and modulation combinations. For example, various satellite links may communicate using physical layer transmission modulation and coding techniques using adaptive coding and modulation schemes, etc. The communication schemes may also use one or more different types of multiplexing schemes, including Multi-Frequency Time-Division Multiple Access ("MF-TDMA"), Time-Division Multiple Access ("TDMA"), Frequency Division Multiple Access ("FDMA"), Orthogonal Frequency Division Multiple Access ("OFDMA"), Code Division Multiple Access ("CDMA"), or any number of other schemes.

Embodiments of the satellite 205 may be implemented as a geostationary satellite 205, a low earth orbit ("LEO") satellite 205, or aerial payloads not in orbit and held aloft by planes, blimps, weather balloons, etc. Other embodiments could have a number of satellites 205 instead of just one. In one embodiment, the satellite 205 may be configured as a "bent pipe" satellite, wherein the satellite 205 frequency may convert the received carrier signals before retransmitting these signals to their destination, but otherwise perform little or no other processing on the contents of the signals. There could be a single carrier signal for each service spot beam 235 or multiple carriers in different embodiments. Similarly, single or multiple carrier signals could be used for feeder spot beams. A variety of physical layer transmission modulation and coding techniques may be used by the satellite 205 in accordance with certain embodiments, including those defined with the DVB-S2 standard. For other embodiments, a number of configurations are possible (e.g., using LEO satellites, mesh networks, star networks, etc.).

The satellite 205 may operate in a multi-beam mode, transmitting a number of spot beams 235, each directed at a different region of the earth. Each spot beam 235 may be associated with one of the user links, and used to communicate between the satellite 205 and a large group (e.g., thousands) of user systems 110 (e.g., user terminals 230 within the user systems 110). The signals transmitted from the satellite 205 may be received by one or more user systems 110, via a respective user antenna 225. In some embodiments, some or all of the user systems 110 include one or more user terminals 230 and one or more CPE devices 260. User terminals 230 may include modems, satellite modems, routers, or any other useful components for handling the user-side communications. Reference to "users" should be construed generally to include any user (e.g., subscriber, consumer, customer, etc.) of services provided over the satellite communications system 200 (e.g., by or through the server system 220).

In a given spot beam 235, some or all of the users (e.g., user systems 110) serviced by the spot beam 235 may be capable of receiving all the content traversing the spot beam 235 by virtue of the fact that the satellite communications system 200 employs wireless communications via various antennae (e.g., 210 and 225). However, some of the content may not be intended for receipt by certain customers. As such, the satellite communications system 200 may use various techniques to "direct" content to a user or group of users. For example, the content may be tagged (e.g., using packet header information according to a transmission protocol) with a certain destination identifier (e.g., an IP address), use different modcode points that can be reliably received only by certain user terminals 230, send control information to user systems 110 to direct the user systems 110 to ignore or accept certain communications, etc. Each user system 110 may then be adapted to handle the received data accordingly. For example, content destined for a particular user system 110 may be passed on to its respective CPE 260, while content not destined for the user system 110 may be ignored. In some cases, the user system 110 stores information not destined for the associated CPE 260 for use if the information is later found to be useful in avoiding traffic over the satellite link, as described in more detail below.

In some embodiments, each user system 110 implements a client optimizer 220 that is in communication with a server optimizer 230 located in the server system 220 (e.g., in the gateway 217). The client optimizers 120 and server optimizer 230 may act to create a virtual tunnel between the user systems 110 and the content servers 150, as described with reference to FIG. 1A. In a topology, like the satellite communications system 200 shown in FIG. 2, vast amounts of traffic may traverse various portions of the satellite communications system 200 at any given time. As discussed above, at least some of the traffic traversing the network may be intercepted by the server optimizer 230 for further processing and for additional functionality. The functionality of the server optimizer 230 may also be assisted and/or exploited by other components of the server system 220 and the user systems 110. Some of this and other functionality of components of an illustrative server system 220 and an illustrative user system 110 are described with reference to various types of functional blocks in FIGS. 3 and 4, respectively.

Figure 3:
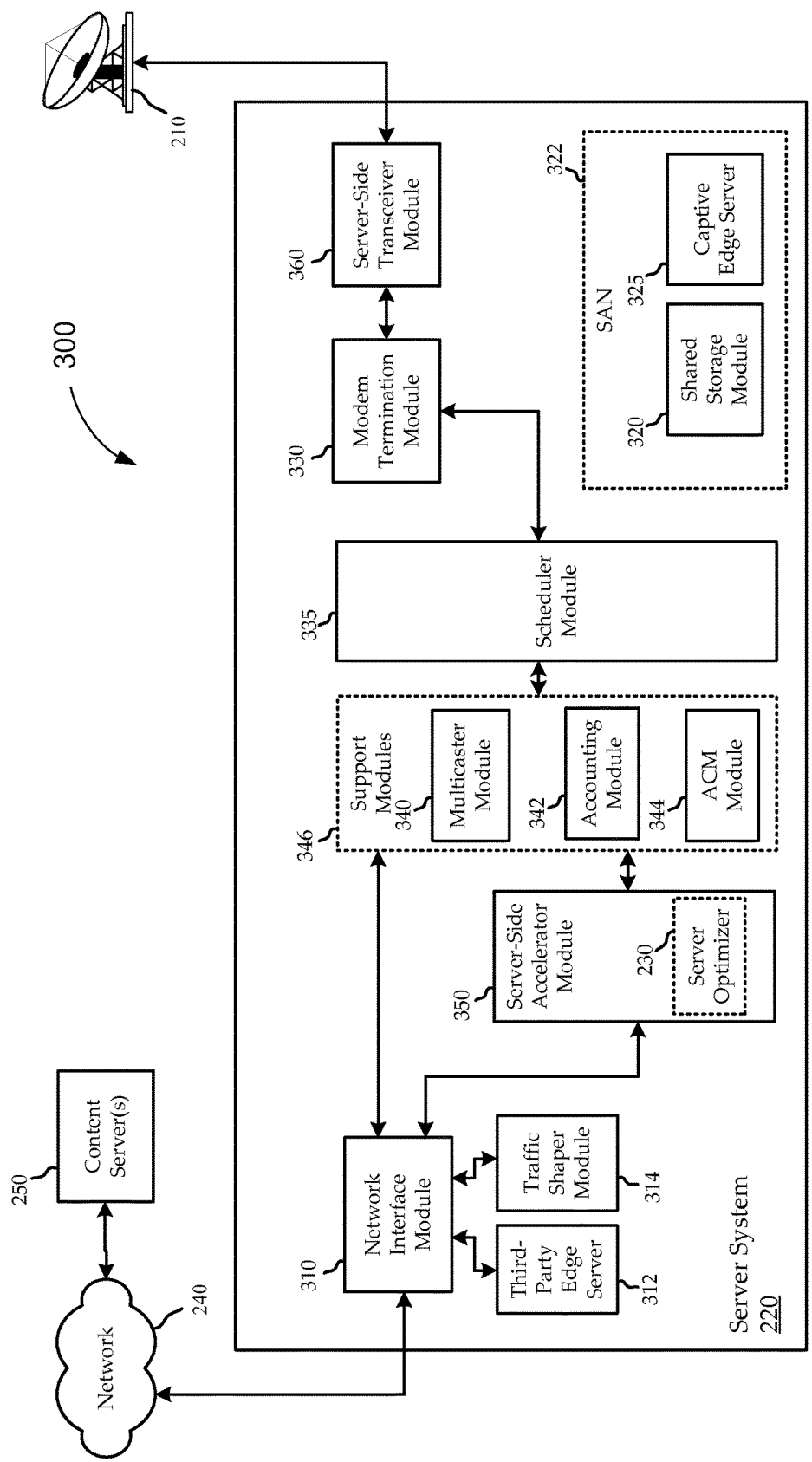
FIG. 3 shows a simplified block diagram of one aspect of an embodiment of a multicast communications system for use with various embodiments of the innovations presented herein.

FIG. 3 shows a simplified block diagram 300 illustrating an embodiment of a server system 220 coupled between a network 140 and an antenna 210, according to various embodiments. The server system 220 may have a number of components, including a network interface module 310, a modem termination module 330, and a server-side transceiver module 360. Components of the server system 220 may be implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

Embodiments of the server system 220 receive data from the network 140 (e.g., the network 140 of FIG. 1A), including data originating from one or more content servers 150 (e.g., or other types of servers, as discussed above) and destined for one or more users in a spot beam (e.g., at a user system 110 in a spot beam 235, as shown in FIG. 2). The data is received at the network interface module 310, which may include one or more components for interfacing with the network 140. For example, the network interface module 310 may include a network switch and a router.

In some embodiments, the network interface module 310 interfaces with other modules, including a third-party edge server 312 and/or a traffic shaper module 314. The third-party edge server 312 may be adapted to mirror content (e.g., implementing transparent mirroring, like would be performed in a point of presence ("POP") of a content delivery network ("CDN")) to the server system 220. For example, the third-party edge server 312 may facilitate contractual relationships between content providers and service providers to move content closer to users in a communications network (e.g., the satellite communications network 200 of FIG. 2). The traffic shaper module 314 controls traffic from the network 140 through the server system 220, for example, to help optimize performance of the communications system (e.g., by reducing latency, increasing effective bandwidth, etc.). In one embodiment, the traffic shaper module 314 delays packets in a traffic stream to conform to a predetermined traffic profile.

Traffic is passed from the network interface module 310 to one or more processing modules. In some embodiments, the processing modules include a server-side accelerator module 350, a scheduler module 335, and support modules 346. In some embodiments, all traffic from the network interface module 310 may be passed to the server-side accelerator module 350 for handling, as described more fully below. In other embodiments, some or all of the traffic from the server-side accelerator module 350 may be passed to the support modules 346. For example, in one embodiment, real-time types of data (e.g., User Datagram Protocol ("UDP") data traffic, like Internet-protocol television ("IPTV") programming) bypass the server-side accelerator module 350, while non-real-time types of data (e.g., Transmission Control Protocol ("TCP") data traffic, like web video) are routed through the server-side accelerator module 350 for processing. Embodiments of the server-side accelerator module 350 provide various types of application, WAN/LAN, and/or other acceleration functionality. In one embodiment, the server-side accelerator module 350 implements functionality of AcceleNet applications from Intelligent Compression Technologies, Inc. ("ICT"), a division of ViaSat, Inc. This functionality may be used to exploit information from application layers of the protocol stack (e.g., layers 4-7 of the IP stack) through use of software or firmware operating in the user system 110 (e.g., in the user terminal 230 and/or the CPE 260).

In some embodiments, the server-side accelerator module 350 may be adapted to provide high payload compression. This allows faster transfer of the data and enhances the effective capacity of the network. The server-side accelerator module 350 can also implement protocol-specific methods to reduce the number of round trips needed to complete a transaction, such as by prefetching objects embedded in HTTP pages. In other embodiments, functionality of the server-side accelerator module 350 is closely integrated with the satellite link through other modules, including the support modules 346, the scheduler module 335, the modem termination module 330, etc., to reduce upload bandwidth requirements and/or to more efficiently schedule to the satellite link. For example, the link layer may be used to determine whether packets are successfully delivered, and those packets can be tied more closely with the content they supported through application layer information. In certain embodiments, these and/or other functions of the server-side accelerator module 350 are provided by a server optimizer 230 resident on (e.g., or in communication with) the server-side accelerator module 350.

In some embodiments, the server optimizer 230 may be implemented with multiple servers. Each of the multiple servers may be configured to handle a portion of the traffic passing through the server-side accelerator module 350. It is worth noting that functionality of various embodiments described herein use data which, at times, may be processed across multiple servers. As such, one or more server management modules may be provided for processing (e.g., tracking, routing, partitioning, etc.) data across the multiple servers. For example, when one server within the server optimizer 230 receives a request from a user (e.g., from a user system 110 on a spot beam 235, as shown in FIG. 2), the server management module may process that request in the context of other requests received at other servers in the server optimizer 230. In one embodiment, coordination between servers is implemented in support of singular storage of data. For example, it may be desirable to avoid caching the same byte sequence twice in two servers that are in communication with each other (e.g., where both servers are part of a storage area network 322 ("SAN") in the server system 220). In another embodiment, servers are configured to communicate to facilitate the identification of deltacasting (e.g., including multicasting and/or other) opportunities, as described more fully below.

It will be appreciated that, while the server optimizer 230 may be illustrated as part of the server system 220, this should not be construed as limiting the location or implementation of the server optimizer 230. In one embodiment, the server optimizer 230 may be implemented by a server in communication with the server system 220 over the network 140. For example, a third party may lease server space that is accessible over the Internet or a private connection (e.g., a high-speed fiber connection). The leased server space may be used for serving the server optimizer 230.

Data processed by the server-side accelerator module 350 may pass through the support modules 346 to the scheduler module 335. Embodiments of the support modules 346 include one or more types of modules for supporting the functionality of the modem termination module 330, for example, including a multicaster module 340, a fair access policy ("FAP") module 342, and an adaptive coding and modulation ("ACM") module 344. In certain embodiments, some or all of the support modules 346 include off-the-shelf types of components.

Embodiments of the multicaster module 340 provide various functions relating to multicasting of data over the links of the communications system. Certain embodiments of the multicaster module 340 use data generated by other processing modules (e.g., the server-side accelerator module 350) to prepare traffic for multicasting. For example, the multicaster module 340 may prepare datagrams as a multicast stream. Other embodiments of the multicaster module 340 perform more complex multicasting-related functionality. For example, the multicaster module 340 may contribute to determinations of whether data is unicast or multicast to one or more users (e.g., using information generated by the server-side accelerator module 350), what modcodes to use, whether data should or should not be sent as a function of data stored at destination user terminals 230, how to handle certain types of encryption, etc.

Embodiments of the accounting module 342 implement various accounting-related functions. In one embodiment, the accounting module 342 collects data from multiple components to determine how much network usage to attribute to a particular user. For example, the accounting module 342 may determine how to count upload or download traffic against a user's fair access policy (FAP). In another embodiment, the accounting module 342 dynamically adjusts FAPs according to various network link and/or usage conditions. For example, the accounting module 342 may adjust FAPs to encourage network usage during lower traffic times. In yet another embodiment, the accounting module 342 affects the operation of other components of the modem termination module 330 as a function of certain FAP and/or other accounting conditions. For example, the accounting module 342 may direct the multicaster module 340 to multicast certain types of data or to prevent certain users from joining certain multicast streams as a function of FAP or other considerations.

Embodiments of the ACM module 344 implement various ACM functions. For example, the ACM module 344 may track link conditions for certain spot beams, users, etc., for use in dynamically adjusting modulation and/or coding schemes. In some embodiments, the ACM module 344 may help determine which users should be included in which customer groupings or multicast streams as a function of optimizing resources through modcode settings. In certain embodiments, the ACM module 344 implements ACM-aware encoding of data adapted for progressive encoding. For example, MPEG-4 video data may be adapted for progressive encoding in layers (e.g., a base layer and enhancement layers). The ACM module 344 may be configured to set an appropriate modcode separately for each layer to optimize video delivery.

When traffic has been processed by the server-side accelerator module 350 and/or the support modules 346, the traffic is passed to the scheduler module 335. Embodiments of the scheduler module 335 are configured to provide various functions relating to scheduling the links of the communications system handled by the server system 220. For example, the scheduler module 335 may manage link bandwidth by scheduling license grants within a spot beam.

In some embodiments, functionality of the server system 220 involves communication and interaction with the SAN 322. Embodiments of the SAN 322 include a shared storage module 320, which may include any useful type of memory store for various types of functionality of the server system 220. For example, the shared storage module 320 may include volatile or non-volatile storage, servers, files, queues, etc. In certain embodiments, the SAN 322 further may include a captive edge server 325, which may be in communication with the shared storage module 320. In some embodiments, the captive edge server 325 provides functionality similar to that of the third-party edge server 312, including content mirroring. For example, the captive edge server 325 may facilitate different contractual relationships from those of the third-party edge server 312 (e.g., between the server system 220 provider and various content providers). In certain embodiments, the captive edge server 325 and/or the third-party edge server 312 are in communication with server-side storage (e.g., within the SAN 322).

It will be appreciated that components of the server system 220 may provide many different types of functionality. For example, some embodiments oversee a variety of decoding, interleaving, decryption, and unscrambling techniques. Other embodiments manage functions applicable to the communication of content downstream through a satellite (e.g., the satellite 205 of FIG. 2) to one or more users (e.g., user systems 110 of FIG. 2). As described more fully below with reference to various embodiments, the server system 220 may handle different types of traffic in different ways. For example, some uses of the communications system involve contractual relationships and/or obligations with third-party content providers to interface with their edge servers (e.g., through the third-party edge server 312), while other uses involve locally "re-hosting" certain content (e.g., through the captive edge server 325). Further, some use cases handle real-time types of data (e.g., UDP data) differently from non-real-time types of data (e.g., TCP data). Many other uses are possible.

In certain embodiments, some or all of these downstream communications functions are handled by the server-side transceiver module 360. Embodiments of the server-side transceiver module 360 encode and/or modulate data, using one or more error correction techniques, adaptive encoding techniques, baseband encapsulation, frame creation, etc. (e.g., using various modcodes, lookup tables, etc.). Other functions may also be performed by the server-side transceiver module 360 or other components of the server system 220, including upconverting, amplifying, filtering, tuning, tracking, etc. For example, in the context of the satellite communications system 200 of FIG. 2, the server-side transceiver module 360 may communicate data to one or more antennae 210 for transmission via the satellite 205 to the user systems 110. Embodiments of the server system 220 also include the modem termination module 330 for receiving modem traffic over the satellite link from users. In some embodiments, the modem termination module 330 is configured substantially as a satellite modem termination system ("SMTS").

In other embodiments, downstream functions and or other functions of the server system 220 are centralized and/or distributed according to various embodiments of the invention. For example, as shown in FIG. 2, a server system 220 may include a number of base stations 215, gateways 217, and/or other components (e.g., hubs, cross-connects, cores, etc.). Similarly, in other types of communications systems, multiple server system 220 components may perform various functions on the server-side of the communications system. In some embodiments, substantially each server system 220 node (e.g., each base station 215, gateway 217, etc.) is capable of performing substantially all the server system 220 functionality. In other embodiments, much of the advanced processing server system 220 functionality is implemented in edge nodes (e.g., base stations 215) of the server system 220, while other nodes (e.g., gateways 217, cores, cross-connects, etc.) provide more basic routing and/or switching functions. In still other embodiments, edge node functionality is fairly limited, while advanced processing functions are more centralized (e.g., in gateways 217, core nodes, etc.).

Figure 4:
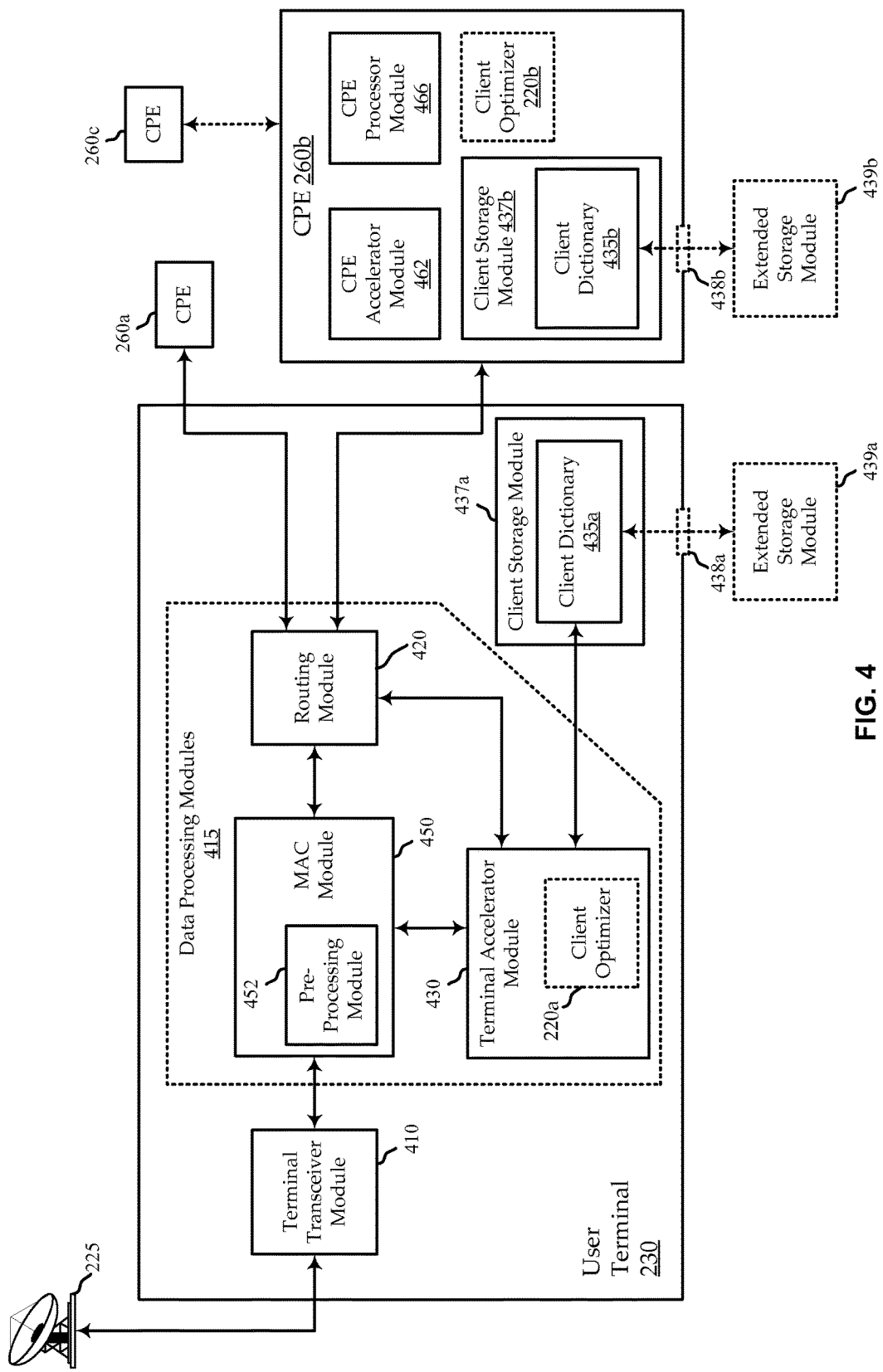
FIG. 4 shows a simplified block diagram of one aspect of an embodiment of a multicast communications system for use with various embodiments of the innovations presented herein.

As described above (e.g., with reference to FIGS. 1 and 2), the server system 220 communicates with one or more user systems 110 configured to perform various user-side (e.g., client-side) communications functions. FIG. 4 shows a simplified block diagram of an embodiment of a user system 110a, including an embodiment of a user terminal 230 coupled between a user antenna 225 and a CPE 260, according to various embodiments. Some embodiments of the user system 110 are configured, as shown in FIG. 2, to communicate over a satellite communications system 200 by interfacing with a server system 220 over a satellite link (e.g., the server system 220 of FIG. 3). Interfacing and other functionality of the user system 110 may be provided by components of the user terminal 230, including a terminal transceiver module 410, data processing modules 415, and a client storage module 437. Embodiments of the data processing modules 415 include a MAC module 450, a terminal accelerator module 430, and a routing module 420.

The components may be implemented, in whole or in part, in hardware. Thus, they may include one or more ASICs adapted to perform a subset of the applicable functions in hardware. Alternatively, the functions may be performed by one or more other processing modules (or cores), on one or more integrated circuits. In other embodiments, other types of integrated circuits may be used (e.g., Structured/Platform ASICs, FPGAs, and other Semi-Custom ICs), which may be programmed. Each may also be implemented, in whole or in part, with instructions embodied in a computer-readable medium, formatted to be executed by one or more general or application specific processors.

A signal from the user antenna 225 is received by the user terminal 230 at the terminal transceiver module 410. Embodiments of the terminal transceiver module 410 may amplify the signal, acquire the carrier, and/or downconvert the signal. In some embodiments, this functionality is performed by other components (either inside or outside the user terminal 230).

In some embodiments, data from the terminal transceiver module 410 (e.g., the downconverted signal) is communicated to the data processing modules 415 for processing. For example, data is communicated to the MAC module 450. Embodiments of the MAC module 450 prepare data for communication to other components of, or in communication with, the user terminal 230, including the terminal accelerator module 430, the routing module 420, and/or the CPE 260. For example, the MAC module 450 may modulate, encode, filter, decrypt, and/or otherwise process the data to be compatible with the CPE 260.

In some embodiments, the MAC module 450 may include a pre-processing module 452. The pre-processing module 452 implements certain functionality for optimizing the other components of the data processing modules 415. In some embodiments, the pre-processing module 452 processes the signal received from the terminal transceiver module 410 by interpreting (e.g., and decoding) modulation and/or coding schemes, interpreting multiplexed data streams, filtering the digitized signal, parsing the digitized signal into various types of information (e.g., by extracting the physical layer header), etc. In other embodiments, the pre-processing module 452 pre-filters traffic to determine which data to route directly to the routing module 420, and which data to route through the terminal accelerator module 430 for further processing.

Embodiments of the terminal accelerator module 430 provide substantially the same functionality as the server-side accelerator module 350, including various types of applications, WAN/LAN, and/or other acceleration functionality. In one embodiment, the terminal accelerator module 430 implements functionality of AcceleNet™ applications, like interpreting data communicated by the server system 220 using high payload compression, handling various prefetching functions, parsing scripts to interpret requests, etc. In certain embodiments, these and/or other functions of the terminal accelerator module 430 are provided by a client optimizer 220 resident on (e.g., or in communication with) the terminal accelerator module 430. Notably, in some embodiments, the client optimizer 220 is implemented as client optimizer 220a on the user terminal 230 and/or client optimizer 220b on the CPE 260b. Data from the MAC module 450 and/or the terminal accelerator module 430 may then be routed to one or more CPEs 260 by the routing module 420.

In some embodiments, output from the data processing modules 415 and/or the terminal accelerator module 430 is stored in the client storage module 437a. Further, the data processing modules 415 and/or the terminal accelerator module 430 may be configured to determine what data should be stored in the client storage module 437a and which data should not (e.g., which data should be passed to the CPE 260). It will be appreciated that the client storage module 437a may include any useful type of memory store for various types of functionality of the user system 110. For example, the client storage module 437a may include volatile or non-volatile storage, servers, files, queues, etc. Embodiments of the client storage module 437a are configured to store some or all of a client dictionary 435, as described more fully below.

In certain embodiments, storage functionality and/or capacity is shared between an integrated (e.g., on-board) client storage module 437a and an extended (e.g., off-board) storage module 439a. For example, the extended storage module 439a may be implemented in various ways, including as an attached peripheral device (e.g., a thumb drive, USB hard drive, etc.), a wireless peripheral device (e.g., a wireless hard drive), a networked peripheral device (e.g., a networked server), etc. In some embodiments, the user terminal 230 interfaces with the extended storage module 439a through one or more ports 438a. In one embodiment, functionality of the client storage module 437 is implemented as storage integrated into or in communication with CPE 260 (e.g., as client storage module 437b in CPE 260b).

Some embodiments of the CPE 260 are standard CPE 260 devices or systems with no specifically tailored hardware or software (e.g., shown as CPE 260a). Other embodiments of the CPE 260, however, include hardware and/or software modules adapted to optimize or enhance integration of the CPE 260 with the user terminal 230 (e.g., shown as alternate CPE 260b). For example, the alternate CPE 260b is shown to include a CPE accelerator module 462, a CPE processor module 466, and a client storage module 437b. Embodiments of the client storage module 437b are configured to store some or all of the client dictionary 435b. Embodiments of the CPE accelerator module 462 are configured to implement the same, similar, or complementary functionality as the terminal accelerator module 430. For example, the CPE accelerator module 462 may be a software client version of the terminal accelerator module 430. In some embodiments, some or all of the functionality of the data processing modules 415 is implemented by the CPE accelerator module 462 and/or the CPE processor module 466. In these embodiments, it may be possible to reduce the complexity of the user terminal 230 by shifting functionality to the alternate CPE 260b.

Embodiments of the client storage module 437b may include any type of dictionary, object or byte caching, data serving, and/or other storage-related components in or in communication with the alternate CPE 260b (e.g., a computer hard drive, a digital video recorder ("DVR"), etc.). In some embodiments, the client storage module 437b may be in communication with an extended storage module 439b, for example, via one or more ports 438b. Of course, many types of CPE 260 are possible, and the functionality of the CPE 260 may be implemented in a number of different types of devices or systems. In some embodiments, the CPE 260 may be a fixed or mobile end device for displaying content to the user, like a television, personal computer, home theater system, cellular telephone, portable music or video player, personal digital assistant, etc. In other embodiments, the CPE 260 may be an intermediate device, configured to communicate to another CPE 260 end device (or even to another CPE 260 intermediate device). For example, the CPE 260 may include a set-top box, a home networking component (e.g., a router, a hub, a femtocell, etc.), or any other type of intermediate device. As shown, CPE 260c is in communication with the user terminal 230 indirectly through CPE 260b, where CPE 260b is acting as an intermediate device.

Further, in some embodiments, the CPE 260 may be integrated, partially or completely, with the user terminal 230. For example, a home theater system may be built around a main interface component that may include a network interface having user terminal 230 functionality, certain CPE 260 functionality, and ports for wired or wireless communication with additional CPE 260 devices. Embodiments of user terminals 230 and/or CPEs 260 may also be configured for compatibility with certain communication standards. For example, CPEs 260 may be configured to support plug-and-play functionality (e.g., through the Digital Living Network Alliance (DLNA) standard), wireless networking (e.g., through the 802.11 standard), etc.

In certain embodiments, the user terminal 230 may be configured to transmit data back to the server system 220. Embodiments of the data processing modules 415 and the terminal transceiver module 410 are configured to provide functionality for communicating information back through the communications system (e.g., through the satellite communications system 200 of FIG. 2 for directing provision of services). For example, information about what is stored in the client dictionary 435 may be sent back to the server system 220 for limiting repetitious file transfers, as described more fully below.

It will be appreciated that the communications system may be used to provide different types of communication services to users. For example, the satellite communications system 200 of FIG. 2 may provide content from content servers 150, through the network 140, to a user's CPE 260, including Internet content, broadcast television and radio content, on-demand content, voice-over-Internet-protocol (VoIP) content, and/or any other type of desired content. It will be further appreciated that this content may be communicated to users in different ways, including through unicast, multicast, broadcast, simulcast, and/or other communications.

As described above, a number of additional and/or improved communications functions may be facilitated by exploiting content sharing and/or other types of opportunities through deltacasting. For example, in a typical communication system, like the satellite communications system 200 of FIG. 2, multiple customers may request the same or substantially similar content at the same or different times. By exploiting this feature of the communication system, it may be possible to optimize (at least partially) the provision of various communication services. For example, link conditions (e.g., bandwidth utilization) may be improved, enhanced services may be offered to customers, costs relating to service provision may be reduced, etc.

Content sharing may be implemented in many different ways, according to embodiments. For example, certain content may be multicast to a number of users in a spot beam, thereby allowing multiple user systems 110 to share channels (i.e., potentially increasing effective throughput). Rather than transmitting a copy of the content to each requesting user through a private unicast channel, fewer copies of the content may be shared by multiple users. In certain embodiments, custom or off-the-shelf components are used to provide this functionality by evaluating multiple communication streams and collapsing them into a single stream within some tolerance (e.g., a small "jitter window," accounting for inter-packet delay variances). In other embodiments, dedicated components in the server system 220 implement this functionality.

According to various embodiments, deltacasting and related functionality may be implemented at least partially through client-server interactions. As discussed above, a server optimizer 230 may determine what content is traversing the various links in the communication system using fingerprints. For example, the fingerprints may be used to identify fingerprint trends (e.g., patterns of byte-sequence communications) and/or to identify actual content features (e.g., information from layers 4-7 of the OSI IP protocol stack). These determinations may then be used to identify and exploit opportunities for improving the communication services over the communications system.

Figure 5:
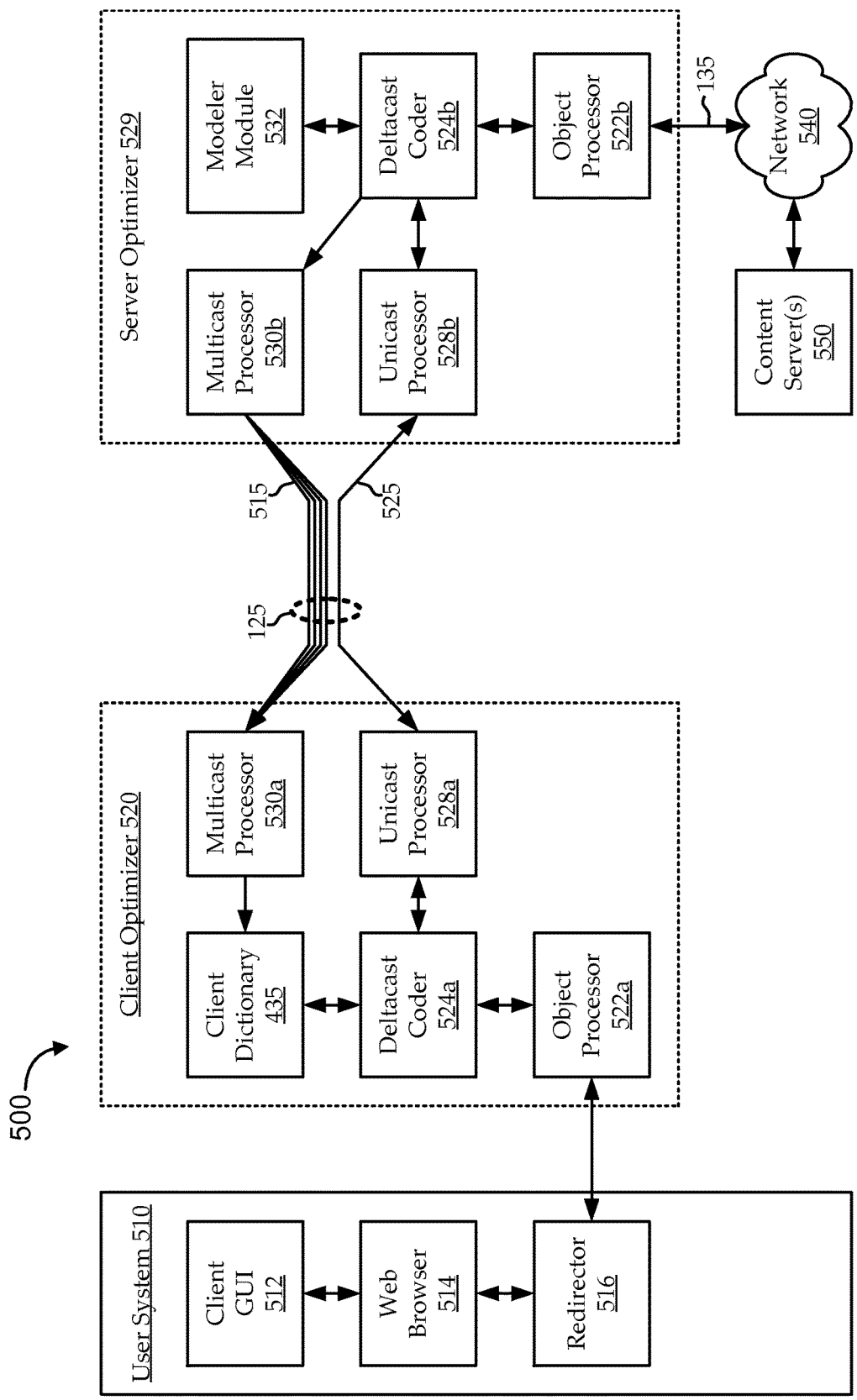
FIG. 5 shows a simplified block diagram of one aspect of an embodiment of a multicast communications system for use with various embodiments of the innovations presented herein.

FIG. 5 shows a block diagram of an embodiment of a communications system 500, illustrating client-server interactivity through a client optimizer 220 and a server optimizer 230, according to various embodiments. In some embodiments, the communications system 500 may be an embodiment of the communications system 100a of FIG. 1A or the satellite communications system 200 of FIG. 2. As shown, the communications system 500 facilitates communications between a user system 110 and one or more content servers 150 via at least one client-server communication link 125 and at least one content network link 135. For example, interactions between the client optimizer 220 and the server optimizer 230 effectively create a tunnel 505 between the user system 110 and the content servers 150. In some embodiments, the content network link 135 may include links through a network 140, like the Internet. Also, as illustrated, embodiments of the client-server communication link 125 support one or more unicast service flows 525 and one or more multicast service flows 515.

In some embodiments, the user system 110 may include a client graphical user interface (GUI) 512, a web browser 514, and a redirector 516. The client GUI 512 may allow a user to configure performance aspects of the user system 110 (e.g., or even aspects of the greater communications system 500 in some cases). For example, the user may adjust compression parameters and/or algorithms, alter content filters (e.g., for blocking illicit websites), or enable or disable various features used by the communications system 500. In one embodiment, some of the features may include network diagnostics, error reporting, as well as controlling, for example, components of the client optimizer 220 and/or the server optimizer 230.

In one embodiment, the user selects a universal recourse locator (URL) address through the client GUI 512 which directs the web browser 514 (e.g., Internet Explorer®, Firefox®, Netscape Navigator®, etc.) to a website (e.g., cnn.com, google.com, yahoo.com, etc.). The web browser 514 may then issue a request for the website and associated objects to the Internet. It is worth noting that the web browser 514 is shown for illustrative purposes only. While embodiments of the user system 110 may typically include at least one web browser 514, user systems 110 may interact with content providers 150 in a number of different ways without departing from the scope of the invention.

The content request from the user system 110 (e.g., from the web browser 514) may be intercepted by the redirector 516. It is worth noting that embodiments of the redirector 516 are implemented in various ways. For example, embodiments of the redirector 516 are implemented within a user modem as part of the modem's internal routing functionality.

The redirector 516 may send the request to the client optimizer 220. It is worth noting that the client optimizer 220 is shown as separate from the user system 110 (e.g., in communication over a local bus, on a separate computer system connected to the user system 110 via a high speed/low latency link, like a branch office LAN subnet, etc.). However, embodiments of the client optimizer 220 are implemented as part of the user system 110 in any useful client-side location, including as part of a user terminal, as part of a user modem, as part of a hub, as a separate hardware component, as a software application on the client machine, etc.

In one embodiment, the client optimizer 220 may include an object processor 522a. The object processor 522a may be configured to perform a number of different processing functions, including Java parsing and protocol processing. Embodiments of the object processor 522a may process hypertext transfer protocol (HTTP), file transfer protocol (FTP), various media protocols, metadata, header information, and/or other relevant information from the request data (e.g., packets) to allow the client optimizer 220 to perform its optimizer functions. For example, the request may be processed by the object processor 522a to determine which objects are being requested and whether data needed to generate the requested object may already be stored in client storage (e.g., in the client dictionary 435 from a prefetch operation, a pre-positioning operation, a multicast caching operation, a previous deltacasting operation, etc.).

In some embodiments, the object processor 522a sends the processed request data to a deltacast coder 524a. The deltacast coder 524a may encode the request into a compressed version of the request using one or more data compression algorithms. For example, these algorithms may employ dictionary coding with the client dictionary 435 configured to store strings so that data from previous web objects can be used to compress data from new pages. Of course, other types of coding are possible according to other embodiments of the deltacast coder 524a.

The processed and/or coded request data may then be further processed by a unicast processor 528a in some embodiments in preparation for communicating the data over the client-server communication link 125 (e.g., as private IP traffic). In various embodiments, the unicast processor 528a processes the data according to one or more protocols, for example a unicast protocol, depending at least on the type of communication links implemented as part of the client-server communication link 125. For example, the client-server communication link 125 may include a wireless link, a cellular link, a satellite link, a dial-up link, etc. In certain embodiments, the unicast processor 528a is configured to implement the Intelligent Compression Technology (ICT) transport protocol (ITP). In one embodiment, ITP maintains a persistent connection between the client optimizer 220 and the server optimizer 230. The persistent connection may enable the communications system 500 to reduce or eliminate inefficiencies and overhead costs associated with creating a new connection for each request. In alternative Embodiments, ITP may be replaced with any other reliable unicast transport, for both this implementation and any other implementation described herein.

In some embodiments, the communication may be received at the other end of the client-server communication link 125 by a unicast processor 528b in the server optimizer 230. In some embodiments, the unicast processor 528b in the server optimizer 230 may be implemented as substantially an identical component to the unicast processor 528a in the client optimizer 220. In other embodiments, implementations of the unicast processors 528 may be tailored to their location (e.g., in the client optimizer 220 or the server optimizer 230). When the request data is received by the unicast processor 528b, the unicast processor 528b may process the request according to the applied one or more protocols. For example, the unicast processor 528b may be configured to implement ITP, such that data sent from the unicast processor 528a according to the ITP protocol can be processed accordingly.

As discussed above, the data received at the server optimizer 230 from the client optimizer 220 may be coded (e.g., dictionary coded) and/or otherwise processed (e.g., according to one or more protocols, like HTTP). Embodiments of the server optimizer 230 include an object processor 522b and a deltacast coder 524b. In some embodiments, the object processor 522b and the deltacast coder 524b are configured to handle processing and/or coding of the request data implemented by the object processor 522a and the deltacast coder 524a of the client optimizer 220, respectively. For example, embodiments of the object processor 522b use features of the deltacast coder 524b and/or dictionary types of information, which may be stored, or modeled, in a modeler module 532 to decode the request data. The request may thus be processed (e.g., translated, decoded, etc.) into a format that is accessible to a source of the requested content (e.g., a website). Of course, in certain embodiments, additional features of the request may be processed by these or other components. For example, if the request includes a cookie (or other special instructions), such as a "referred by" or type of encoding accepted, information about the cookie or instructions may be stored as part of a cookie model in the modeler module 532 or another location.

Embodiments of the object processor 522b may then forward the decoded request to an appropriate destination (e.g., a content server 150) over the content network link 135 (e.g., via a network 140). The content network link 135 may include, for example, a cable modem connection, a digital subscriber line (DSL) connection, a T1 connection, a fiber optic connection, etc. As discussed above, in some embodiments of the communications system 500, the content network link 135 manifests substantially lower latency than that of the client-server communication link 125.

Response data may be received by the object processor 522b, in response to the request, from the appropriate destination (e.g., the content server 150) over the content network link 135. It will be appreciated that the response data may include various types of information, such as one or more attachments (e.g., media files, text files, etc.), references to "in-line" objects needed to render a web page, etc. Embodiments of the object processor 522b may be configured to interpret the response data, which may, for example, be received as HTML, XML, CSS, Java Scripts, or other types of data. As described more fully below, a fingerprint of the response data may be generated by the deltacast coder 524b (e.g., using dictionary coding techniques) and used for various types of deltacasting and/or other optimization functions.

The fingerprint may be used to determine how to further handle the response data, as described below. In some embodiments, processed and/or coded (e.g., compressed) response data is sent over the client-server communication link 125 to the client optimizer 220. The data may be sent as a unicast service flow 525 from the unicast processor 528b in the server optimizer 230 to the unicast processor 528a in the client optimizer 220; and/or the data may be sent as one or more multicast service flows 515 from the multicast processor 530b in the server optimizer 230 to the multicast processor 530a in the client optimizer 220.

Further, when the client-server communication link 125 may include multiple multicast service flows 515, the multicast service flows 515 may be configured in various ways. In various embodiments, for example, the multicast service flows 515 are configured to each communicate at a different modcode point, on a different spot beam, and/or on a different carrier. This may allow for more efficient communication of traffic to groups of user systems 110 having particular characteristics. For example, if certain traffic is determined to be destined for a user system 110 capable of communicating at a particular modcode point, the traffic may be multicast on a multicast service flow 515 that operates at or near this modcode point for maximum efficiency (e.g., rather than at the lowest modcode point needed to transmit to all user systems 110 in the multicast group). While this may, in certain cases, cause some of the user systems 110 in the multicast group to be unable to reliably receive all the multicast data, there may still be an overall improvement in the operation of the communications system 500.

In other embodiments, modcodes may be handled (e.g., selected, adapted, optimized, etc.) for various affects. In one embodiment, as described above, the modcode is selected according to link conditions between the server optimizer 230 and the client optimizer 220 associated with a requesting client, if any (i.e., so that at least the requesting client can reliably receive the communication). In another embodiment, the modcode may be selected so that at least some threshold group (e.g., number) of clients can reliably receive the communication. In still other embodiments, the modcode may be adapted to changes in link conditions between the server optimizer 230 and one or more client optimizers 120. For example, adaptive coding and modulation techniques may be used. The modcode may be adapted by estimating or monitoring link conditions from the server-side (e.g., estimating signal-to-noise ratios, bandwidth, etc.) or via feedback from the client-side. In one embodiment, the client optimizer 220 communicates information, like whether packets are reliably received, as feedback to the server optimizer for dynamically adjusting the modcode.

The data received at the client optimizer 220 from the server optimizer 230 may be coded (e.g., dictionary coded) and/or otherwise processed (e.g., according to one or more protocols, like HTTP). Embodiments of the object processor 522a and the deltacast coder 524a in the client optimizer 220 are configured to handle processing and/or decoding of the response data, respectively. For example, embodiments of the object processor 522a use features of the deltacast coder 524a, including functionality of the client dictionary 435, to decode the response data. Embodiments of the object processor 522a may then forward the decoded response to the user system 110 (or to other components of the user system 110, where the client optimizer 220 is part of the user system 110). The response may then be used by components of the user system 110. For example, a media object received as part of the response data may be played back through a media player at the user system 110, used to render a web page through the client web browser 514, etc.

It will be appreciated that, while the above description focuses on browser requests and responses to those requests, embodiments of the invention function within many other contexts. For example, embodiments of the communication system 500 are used to provide interactive Internet services (e.g., access to the world-wide web, email communications, file serving and sharing, etc.), television services (e.g., satellite broadcast television, Internet protocol television (IPTV), on-demand programming, etc.), voice communications (e.g., telephone services, voice-over-Internet-protocol (VoIP) telephony, etc.), networking services (e.g., mesh networking, VPN, VLAN, MPLS, VPLS, etc.), and other communication services. As such, the "response" data discussed above is intended only as an illustrative type of data that may be received by the server optimizer 230 from a content source (e.g., a content server 150). For example, the "response" data may actually be pushed, multicast, or otherwise communicated to the user without an explicit request from the user.

For illustrative purposes, traffic over the communications system 500 may be categorized into private-interest traffic and public-interest traffic. Private-interest traffic may include any traffic for which multicasting the traffic to multiple user systems 110 is deemed inefficient. For example, where the traffic is of interest to only one user system 110, or a very small number of user systems 110, it may cost more to set up and process a multicast service flow than to simply unicast the traffic to each interested user system 110. Notably, a user system 110 may act as an intermediate node (e.g., a hub, switch, router, etc.) that forwards information to multiple end users. For example, in a LAN, data may be received at the client-side for all computers in the LAN by a switch, which may then forward the data to appropriate users in the LAN; traffic that is of interest to only one user system 110 may, in fact, be of interest to many users within a LAN serviced by the one user system 110. Alternatively, each user in the LAN may be considered a separate user system 110 running a separate client optimizer 220. As such, the relevant determination may be, from the perspective of the server optimizer 230, how many unicast service flows 525 on the client-server communication link 125 would be needed to unicast the data to all interested users. In contrast to private-interest traffic, public-interest traffic may include any traffic for which multicasting the traffic to multiple user systems 110 is deemed more efficient than unicasting the traffic to each interested user system 110.

Notably, a number of types of traffic may be either private-interest traffic or public-interest traffic, depending on the context. One example is control traffic, which may be used for various types of control of the communications system. For example, control traffic may be used to send control signals to the client optimizer 220 to direct the client optimizer 220 to accept a particular multicast service flow 515. In one embodiment, individual control traffic is sent as unicast service flows 525 to particular client optimizers 120. In another embodiment, certain control traffic is sent to groups of client optimizers 120 (e.g., to some or all of the user systems 110 serviced by a particular spot beam of a satellite communications system) as one or more multicast service flows 515.

Another type of traffic that may be either private-interest traffic or public-interest traffic is media object data. In one embodiment, a first user takes video with a digital camera as part of a videoconference with a second user. The video file may be considered private-interest traffic, as it may be of interest only to the recipient and may never be requested, or even be made accessible, to other users on the communications system 500. In another embodiment, a reporter for CNN takes video with a digital camera as part of a live feed to CNN.com. The video file may be considered public-interest traffic, as it may be accessed by thousands of users on the communications system 500.

Of course, the determination of whether to classify traffic as private-interest traffic or public-interest traffic can be made in a number of ways and may involve many factors. The factors used to make the determination may be derived from the traffic itself or from other sources (e.g., from an evaluation of current link conditions or current system usage, from third-party information, etc.). When analyzing the traffic itself, information may be derived from the header portion and/or the content portion of the datagrams. As noted above, the header portion may provide straightforward sources of information about the communication and/or the content of the communication (e.g., through protocol information, metadata, public or proprietary tags, etc.). However, the information from the header portion may often be limited from the perspective of a man-in-the-middle type of server optimizer 230. For example, relevant header information may be encoded in a proprietary format, may be misleading as to the underlying by sequence, etc.

The content portion of the traffic received at the server optimizer 230 may include the actual objects (e.g. content file data) being sent to users via respective user systems 110. It will be appreciated that it may be difficult or impossible to obtain certain types of information looking only at the content portion of the traffic datagrams, as the content portion may look just like a byte sequence. Of course, various types of data processing (e.g., statistical analysis) can be used to derive information from the byte sequence, but it may be difficult to derive high-level information, such as the file type associated with the data. For example, a movie is streamed from a VOD server (e.g., as the content server 150) to a user terminal 110. Proprietary tags in the header portion of the traffic may indicate the name of the movie and the file type for processing at the user's playback device, while the content portion may include only the sequence of bytes that define the actual movie content. When the streaming traffic is intercepted by the server optimizer 230, the server optimizer 230 may be unable to read the header portion of the traffic, and may, therefore, be unable to use that information for making multicast and/or other determinations.

Figure 6:
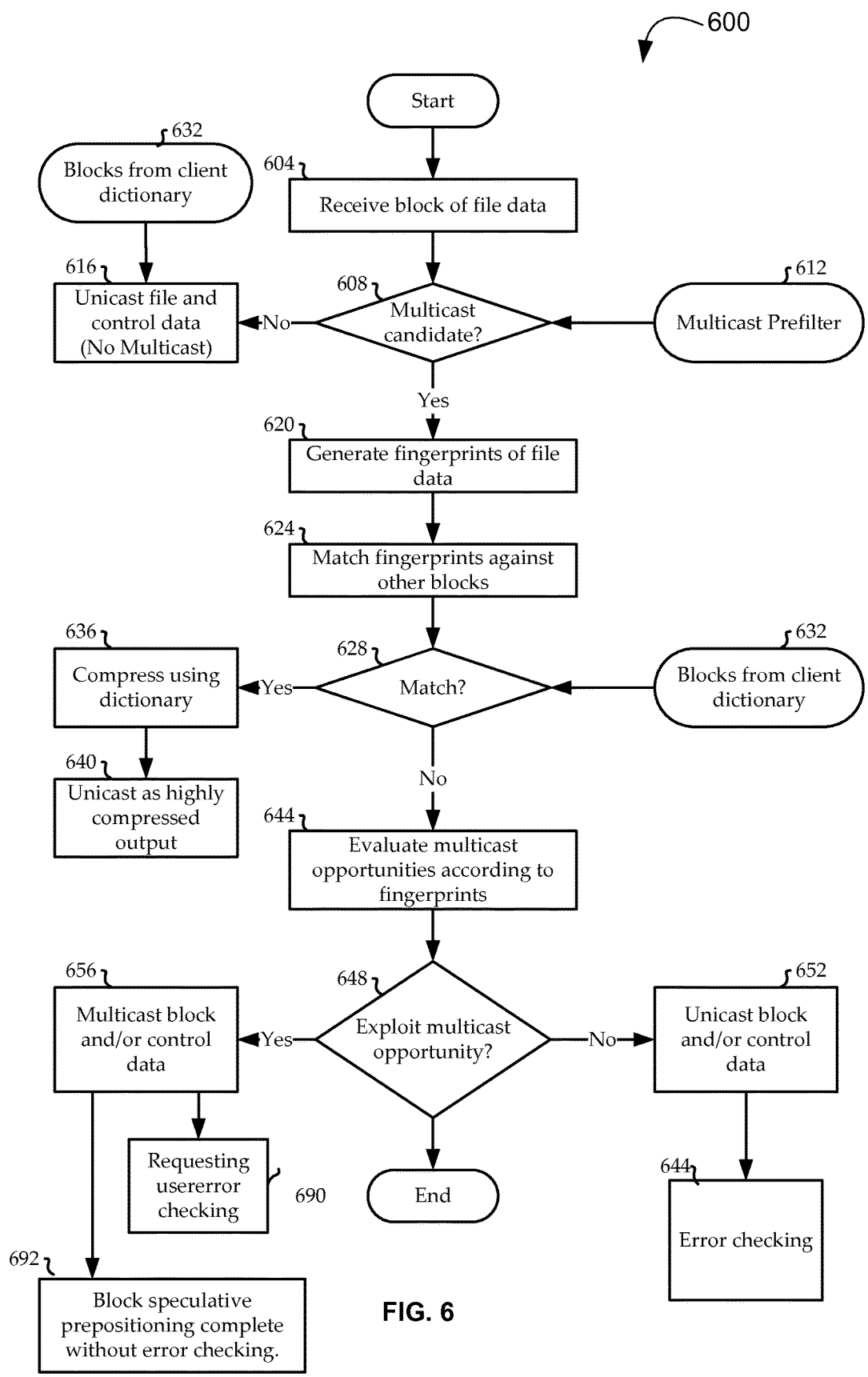
FIG. 6 shows a flow diagram of an illustrative method for using an embodiment of the innovations herein to handle multicast traffic reliability over a communications system that includes a deltacasting aspect.

Embodiments of the server optimizer 230 process the content portion of the traffic as byte-level data using various deltacasting techniques. FIG. 6 is a flow diagram of an illustrative method 600 for using deltacasting to handle traffic over a communications system, according to various embodiments. For the sake of clarity, the method 600 is described in the context of the communications system 500 of FIG. 5. It will be appreciated, however, that various modifications may be made to the communications system 500 without limiting the scope of the method 600.

Embodiments of the method 600 begin at block 604 by receiving a block of content data. For example, the content data block (e.g., file data, streaming data, web object data, etc.) may be received as part of traffic intercepted by the server optimizer 230 from a content server 150 over the content network link 135. In some embodiments, at block 608, an initial determination is made as to whether the content data block is a multicast candidate as a function of one or more criteria used to define a multicast prefilter 612. This determination may be made by the object processor 522*b*.

The multicast prefilter 612 may be defined according to any types of multicast or similar filtering criteria known in the art. In one embodiment, the multicast prefilter 612 may be based on the file size of the content data block. For example, only files larger than a certain minimum size may be considered for multicasting. In another embodiment, information from the header portion of the traffic may be used by the multicast prefilter 612. For example, the multicast prefilter 612 may be defined to make the initial multicast determination in block 608 according to source IP address, host URL, destination IP address, file type, protocol, HTTP metadata, etc. For example, all video files over a certain size coming from YouTube.com may be considered multicast candidates, while video files being sent as an email attachment to a single recipient may not be considered multicast candidates.

In some embodiments, data relevant to the multicast prefilter 612 may be enhanced through trusted source relationships. For example, contractual relationships may be formed with content and service providers to allow visibility by the service providers into the content traversing the network. Embodiments of the trusted source relationships include access to encryption keys (e.g., including master keys), authorization to re-serve or re-host content (e.g., through a mirroring relationship as described more fully below), etc. In the context of these relationships, the server optimizer 230 may be able to use certain types of proprietary metadata to make initial multicasting determinations.

When it is determined at block 608 that the content data block is not a multicast candidate, the content data block (e.g., or at least a portion of the content data block) may be unicast, along with any relevant control data, to the appropriate user system(s) 110. For example, as described above, the content data block may be processed by the object processor 522*b* and/or the deltacast coder 524*b*, and sent as a unicast service flow 525 over the client-server communication link 125 via the unicast processors 528. The data may then be received by the client optimizer 220, processed and/or decoded, and forwarded, as appropriate, to components of the user system(s) 110.

When it is determined at block 608 that the content data block is a multicast candidate (e.g., according to the multicast prefilter 612 criteria), the content data block is further processed by the server optimizer 230 to determine if any or all of the content data block will, in fact, be sent over one or more multicast service flows 515. At block 620, a fingerprint is generated (e.g., a fingerprint is calculated). In some embodiments, the fingerprint is generated at block 620 by the deltacast coder 524*b* of the server optimizer 230.

In certain embodiments, the fingerprint may be generated using cryptographic hash functions (e.g., generated by a Message-Digest algorithm 5 (MD5) technique), non-secure hash functions (e.g., generated by a cyclic redundancy check (CRC) technique), or other similar techniques. In other embodiments, the fingerprint can be generated in any way, such that the resulting fingerprint can be used to indicate that one particular byte sequence (or a portion of the byte sequence) matches another particular byte sequence (e.g., or a portion of another byte sequence). Embodiments of dictionary coding (e.g., particularly delta coding) and related techniques are described in more detail in U.S. Pat. No. 8,010,705, entitled "METHODS AND SYSTEMS FOR UTILIZING DELTA CODING IN ACCELERATION PROXY SERVERS", filed on Jun. 3, 2009, which is incorporated herein by reference for any and all purposes.

In some embodiments, the fingerprint may be a compressed version of the byte sequence. In other embodiments, the fingerprint is a checksum, hash, or other technique applied to some or all of the object data. For example, in one embodiment, a checksum of the first megabyte of data in the byte sequence may be used as a fingerprint. This fingerprint may then be compared to other fingerprints to find a match. Notably, embodiments may ultimately seek multicast opportunities and/or other opportunities for optimization of the communications system 500. As such, it may be inefficient to generate fingerprints on very small blocks of data (e.g., at high densities), since it may not be efficient to exploit opportunities where only small blocks are identified as matches. Further, decreasing the size of blocks may increase the size of the dictionary.

It is worth noting that the traffic may include more than just the content data block for which a fingerprint is being generated, or the traffic may include multiple different content data blocks for which fingerprints are generated. In one example, a media file is received at the object processor 522*b* of the server optimizer. The object processor 522*b* and/or the deltacast coder 524*b* may strip off data (e.g., header information) that is not needed for generating the fingerprint at block 620. In another example, an email is received having the media file as an attachment. The object processor 522*b* and/or the deltacast coder 524*b* may perform an extra step of stripping off the email data, in addition to the header and other data, to effectively isolate the byte sequence for fingerprint generation at block 620.

In block 624, the fingerprint is matched against other fingerprints of other content data blocks in the communications system 500. Determining which other content data blocks are "in the communications system 500" may include different types of analyses for different use cases. For example, in one embodiment, it is desirable to know whether the fingerprint indicates a matching content data block already stored at a particular user system 110 (e.g., in the client dictionary 435, etc.). In another embodiment, it is desirable to know whether the fingerprint indicates a matching data block already stored at the server-side of the communications system 500 (e.g., in server-side storage (not shown) or other storage accessible to the server optimizer 230). In still another embodiment, it is desirable to know whether the fingerprint indicates a matching data block currently being communicated over a unicast service flow 525 or one or more multicast service flows 515. In various embodiments, the modeler module 532 in the server optimizer 230 is configured to store models that may be useful for making various determinations (e.g., models of client dictionaries 435, models of server-side caches or dictionaries, models of past and current streams sent as either unicast service flows 525 or multicast service flows 515, etc.).

It will be appreciated that a number of different types of determinations may be made, depending on which blocks are being evaluated to find a match, each opening up potential deltacasting opportunities. One such determination is made in some embodiments in block 628, where the fingerprint of the content data block generated in block 620 is compared with blocks from the client dictionary model 632 to determine whether there is a match. For example, embodiments of the client dictionary 435 in the client optimizer 220 represent what is stored at a particular client (e.g., at a user system 110), and embodiments of the modeler module 532 at the server optimizer 230 store a model of the each client dictionary 435. If the content data block is destined for a particular client, the server optimizer 230 may use the model of the respective client dictionary 435 stored in the modeler module 532 to look for matches.

If a match is identified, this indicates that the byte sequence (or the portion of the byte sequence) is already stored local to the client (e.g., in the client's client dictionary 435). In that case, at block 636, all or relevant portions of the content data block may be compressed using the dictionary model (e.g. dictionary indexes). At block 640, the highly compressed version of the content data block may then be unicast to the client. In some embodiments, the content data block is compressed by the server-side deltacast coder 524b and communicated as a unicast service flow 525 to the client optimizer 220 via the unicast processors 528.

If no match is found at block 628, one or more types of multicast opportunities are evaluated at block 644. According to various embodiments, multicast opportunities evaluated at block 628 may include opportunities for multicasting some or all of the data of the content data block (e.g., or other data) as a function of finding matches between the content data block and other blocks in the communications system 500, as described above. In one example, where a content data block being requested by a first user may be already being communicated to one or more other users (determined as a function of the byte-level data), it may be desirable to create a multicast service flow 515 or to add the requesting user to an existing multicast service flow 515.

In some embodiments, the method 600 evaluates multicast opportunities at block 644 even where a match is found at block 628 (e.g., if a partial match is identified). However, it is worth noting that identification of a match identified at block 628 may typically indicate that very high compression of the data is possible (e.g., in some cases, 10,000-to-1 compression is available using the client dictionary 435). As such, it may be assumed in some embodiments that it is always more efficient to just unicast the highly compressed data at block 640 than to use system resources to evaluate multicast opportunities at block 644 (e.g., and potentially to set up a multicast service flow 515).

When multicast opportunities are evaluated in block 644, a determination may be made at block 648 as to whether multicast opportunities exist and if they should be exploited. For example, even where a multicast opportunity exists, it may be inefficient to spend the resources to exploit the opportunity (e.g., to set up a multicast service flow 515). Notably, a similar type of determination is described above with reference to block 608. However, the evaluation (s) made in block 608 looked at metadata, file sizes, and other header-types of information. The evaluation (s) made in block 644, on the contrary, use byte-level data from the content portion of the traffic datagrams and/or their respective fingerprints to match certain criteria (e.g., other blocks, etc.). As discussed above, making evaluations at the byte-level (e.g., using fingerprints) may be difficult for a number of reasons.

Further, multicast opportunities may be evaluated and fingerprint generation can be tailored in various ways depending on the types of opportunities being evaluated (e.g., the fingerprint may, itself, be a sequence of bytes or part of a more complex system of determining the associated byte sequence). By way of example, the fingerprints may be used in the context of identifying multicast opportunities with current service flows (e.g., to see if content requested by one user is currently being unicast or multicast to other users). To facilitate this type of identification, one embodiment generates maps having keys being the various fingerprints identifying the content data block and payloads that provide data about transfers underway or other useful information.

In certain embodiments, the maps may be monitored or set or limited to be a predetermined maximum size to avoid unnecessary processing of data. For example, techniques are used to restrict the cases where the fingerprint is added to the map. In one embodiment, protocols that are "uninteresting" are excluded. For example, fingerprints may be created only for protocols known (e.g., predetermined) to be interesting, such as HTTP, certain media download protocols, etc. (e.g., as prefiltered in block 608). In another embodiment, small objects are excluded, as described above with reference to block 608. For example, if the size of the requested object is known (or predictable) in advance, it may be used as a filter—if the object is smaller than some threshold size, the fingerprint is not added to the map. When the object size is unknown (or not practically predictable), embodiments may wait until at least a minimum amount of data has been received, then filter out the noise (e.g., very small objects). Of course, it may be important to avoid delaying the map entry too long, such that it would cause the optimizer to miss certain a match with a new download. In some embodiments, when the download is complete, the fingerprint is removed from the map.

If a determination is made at block 648 that either no multicast opportunities exist, or that the multicast opportunities should not be exploited, the content data block data and/or any related control data is unicast at block 652, where appropriate. For example, if the content data block is requested by one user and no multicast opportunities exist, the content data block data may be unicast to the requesting user. In some embodiments, unicasting the data at block 652 involves communicating the data as a unicast service flow 525 to the client optimizer 220 via the unicast processors 528.

If a determination is made at block 648 that a multicast opportunity exists and should be exploited, the content data block may be multicast to one or more clients at block 656 (e.g., including the requesting client, where appropriate). In some embodiments, multicasting the data at block 656 involves communicating the content block data over one or more multicast service flows 515 to the client optimizer 220 via the multicast processors 530. In certain embodiments, the fingerprint generated in block 620, or another representation of the data (e.g., the byte sequence itself, a compressed version or a portion of the byte sequence, or a different type of fingerprint) is stored at the server-side for later use by the communications system 500. For example, storage of relevant information may be useful in generating or identifying future multicast opportunities, tracking and/or characterizing network usage, prefetching, etc.

Similar to the process discussed above for the system of FIGS. 1A-1C, when a user system 210 has requested the file data for which a block is currently being multicast, error checking and correction will follow immediately in order to allow the user system that requested the file data to use the file data in step 690. In order to avoid overwhelming the reverse channel, error requests for speculatively prepositioned blocks in step 692 for at least a portion of the systems where the object was speculatively prepositioned may not occur until the system where the file has been prepositioned requests the file. In a system using fingerprints, the server creating fingerprints may supply a globally unique identifier for all blocks being multicast. Thus, any system may use the globally unique identifier to identify blocks of data for which there are errors or missing packets. In systems where the data was speculatively prepositioned, this list of blocks containing errors may be stored until the object associated with the block is requested. This list of blocks may further enable a system to observe a channel for multicast object repair messages.

Just as in 608 a system decides if a block of data being sent as an object repair message may be a multicast candidate, the system may use a similar or identical process to determine whether to multicast an object repair message. Based on the determination, an object repair message may either be sent as a unicast object repair message or as a multicast object repair message. In one potential embodiment, a multicast system may identify missing packets and retransmit those packets. In alternative embodiments, a multicast system may receive a reliability message simply including the globally unique identifier for a block of data, indicating that a first user identified errors in that block of data. The multicast system may then determine whether the block of data may be a multicast candidate. Such a determination may be based on recently received reliability messages associated with the same block, or based on bandwidth considerations. If the block is a multicast candidate, the entire block may be multicast as an object repair message, along with the globally unique identifier. A first user will receive the block as part of a first object repair message, and immediately check for errors with the newly received copy of the block. Systems that had initially received the speculatively placed object may store the second transmission of the block along with the first transmission of the block until the object is requested at those systems. Alternatively, those systems may initiate an error checking process based on the receipt of the second copy of the block, and check both copies for errors.

It will be appreciated that, in some embodiments, multicasting or unicasting data is implemented in different ways. For example, in the satellite communications system 200 of FIG. 2, some or all of the receivers (e.g., user systems 110) in a spot beam 235 may inherently be capable of receiving at least a portion of any traffic being sent over the spot beam 235 by virtue of being tuned to the appropriate carrier, able to receive data at the current modcode point, etc.; effectively, the satellite communications system 200 broadcasts everything over the air. As such, as discussed above with reference to FIG. 1B, unicasting or multicasting to one or more user systems 110 may, in fact, involve broadcasting the data over the satellite link or cable communication system and also broadcasting control data to direct receivers to either accept or ignore relevant portions of the broadcast data.

In one illustrative embodiment, a system may determine that content requested by one user has a high probability of being accessed by a group of non-requesting users sharing a satellite spot beam on the communications system 500. The content is broadcast over the satellite link with a stream identifier that designates it as a multicast stream. Control data is also sent directing user systems 110 associated with the interested users to "listen" to the multicast stream (e.g., to accept, rather than ignore, data with that stream identifier as it is received). In effect, this creates a multicast group of the interested users. In different embodiments, the control data may be communicated to the multicast group either as respective unicast service flows 525 to each client via the unicast processors 528 or as part of a multicast control channel sent over a multicast service flow 515 via the multicast processors 530. It will be appreciated that, for the sake of bandwidth efficiency, embodiments typically send the control data over the multicast control channel. For example, all the user systems 110 may be constantly listening to the multicast control channel to find out (e.g., among other things) which streams they should accept. Of course, other implementations are possible according to various embodiments for unicasting or multicasting the data over various unicast service flows 525 and/or multicast service flows 515 to the client optimizer(s) 120.

Once the data is received at the client optimizer 220, it may be stored at the client-side (e.g., blocks of the data may be stored and indexed by the client dictionary 435). In certain embodiments, storage in the client dictionary 435 ultimately causes a record of the data to be reflected at the server optimizer 230 if a model of the client-side client dictionary 435 is updated (e.g., through synchronization of the modeler module 532). When it is determined in block 648 that the data will be multicast in block 656 (e.g., and/or when the data is determined to be unicast in block 652), the data may be compressed and/or otherwise coded before it is sent over the client-server communication link 125. In one embodiment, the data is zip-coded prior to being sent over the client-server communication link 125. When the zipped data is received at the client optimizer 220, the data is added to the client dictionary 435.

Even with the use of this encoding, the bandwidth for the reverse channel remains valuable, and delayed reliability for prefetched objects may be used. Thus, following the multicasting in step 656, error checking and correction will follow immediately in step 690 for the user system 210 that requested the file data for which a block is currently being multicast, in order to allow the user system that requested the file data to use the file data. In order to avoid overwhelming or unnecessarily using the reverse channel, even with the efficiencies of library encoding, error requests for speculatively prepositioned blocks may not occur until the system where the file has been prepositioned requests the file in step 692.

It will now be appreciated that embodiments allow usage of fingerprints, generated at the byte-level of the content portion of traffic traversing the network, to identify and/or exploit multicasting opportunities. Of course, generation of the fingerprints, as discussed in the context of the method 600 of FIG. 6, may enable additional features as well. In particular, the generation of the fingerprints may allow a level of content awareness, even where the server optimizer 230 is acting as a transparent intercept protocol and has little or no access to certain high-level information (e.g., header portion information, like URLs, file types, or other metadata).

For example, while the method 600 was discussed in terms of processing a single data block as it is received at block 602, embodiments of the communications system 500 may, in fact, perform these steps numerous times. For example, over a period of network operation, millions of requests may be processed from thousands of clients, resulting in massive amounts of traffic traversing the communications system 500. Meanwhile, large numbers of data fingerprints may be generated and/or stored, which may yield opportunities for statistical processing to determine trends and/or other usage information. This type of information can then be used to indirectly develop a content awareness (e.g., make certain assumptions about byte sequences, like content popularity, user correlations, etc.), even where usage of metadata is limited.

It is worth noting that the use of fingerprinting (e.g., and/or other dictionary coding techniques) to make multicasting and related determination may provide a number of features. One feature is that deltacasting opportunities may be identified and/or exploited even where there is little or no access to certain metadata. For example, as discussed above, the server optimizer generates signatures based on byte level data and may not require knowledge of "header portion" information (e.g., file types, proprietary tags, protocol tags, etc.) to make its determinations.

Another feature is that fingerprinting techniques may allow deltacasting opportunities to be identified, even where the content source or other "header portion" (e.g., metadata) information is different. For example, say viewers are watching the same television show at the same time from different sources (e.g., different television channels are broadcasting the same content, different websites are mirroring the same content, etc.). Fingerprinting techniques can find matching blocks, as the blocks will match even where the content sources are different. Similarly, deltacasting opportunities may be identified even where cache-busting, anonymizer, spoofing, mirroring, and/or other techniques are used (e.g., to alter URLs, to implement content data network (CDN) functionality, etc.).

Still another feature is that deltacasting techniques may be used transparently to preserve communications from the perspective of end users and content sources. In particular, an end user and a content source may effectively experience the same byte-for-byte communications with or without deltacasting. For example, even though requests and/or responses are intercepted according to deltacasting embodiments, when a user requests data from a content source, the content source may ultimately provide the same bytes to the end user as if there were a unicast link between the end user and the content source.

It is also worth noting that that embodiments allow substantially transparent optimization of communications while preserving certain legal and business relationships, including, copyright, digital rights management, subscription, and/or other obligations. For example, as discussed above, content data is stored in dictionaries effectively as dissociated blocks of data, such that the content can only be recreated from those blocks using appropriate dictionary references (e.g., indexes). According to various embodiments, those dictionary references are unavailable to clients without a new request from the content source.

IV. Alternative Embodiments

In one potential embodiment, a single Mulitcast Processor 530*b* may serve all sessions on a Server Optimizer 529. Multiple channels may be supported, such that the transport protocol may allow any session to use any channel, with the session assignments are made in a module that uses the transport. Each channel may have a separate control instance containing the modules associated with the channel, such as a throttle group, a sender module, redundant queues, and control data. Many different data streams may be sent simultaneously over a single channel in such a system, with separate algorithms provided for sending control and data packets. Control packets may be sent on a channel on which all users are listening. The control packets contain information about the data being sent over the channels. In one potential embodiment, a control channel might use a low symbol rate so that it can be received by all clients, and then the clients may use this data to decide which streams to receive.

In this non-limiting potential embodiment, control packets may need a different reliability strategy than the reliability strategy used by the data. Because control packets often consist of isolated individual packets, and are sent to all users with no preferred user, negative acknowledgement may not be preferable for control packets. In such an embodiment sending one or more redundant copies, with a delay in between to reduce the chances that a temporary link problem causes both copies to be dropped may be a preferable method of compensating for potential errors, with no ACKs or NACKs used for these packets.

For the data reliability in one potential embodiment, the strategy for data packet reliability may be to use NACKs plus sequence numbers that allow the receiver to detect holes in the sequence. The last packets in a page or stream have flags set so that receiver can use a timer to detect missing packets at the end. Redundant copies of the last packet may be sent to reduce the reliance on timers for identifying the end of a transmission. In one potential embodiment, all receivers may emit NACKs, with receivers that are speculatively prepositioning the data waiting until the data is requested by the specific individual receiver to emit a NACK for missed packets.

Figure 7:
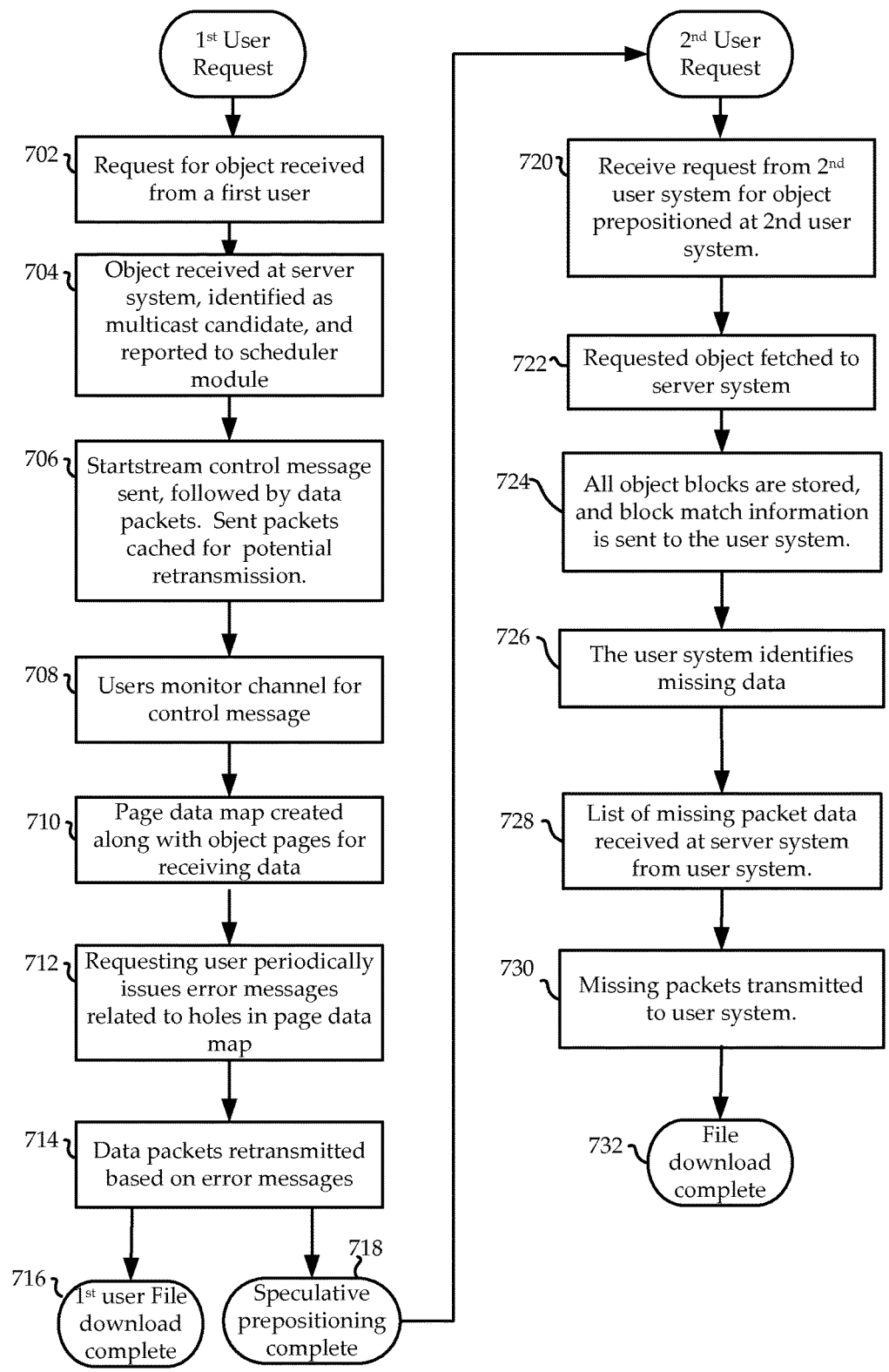
FIG. 7 shows a flow diagram of an illustrative method for using an embodiment of the innovations herein to handle multicast traffic reliability over a communications system.

FIG. 7 describes one illustrative embodiment of a multicast transport protocol with delayed reliability for use with a multicast communication channel in accordance with the embodiment described immediately above. The process of FIG. 7 typically begins with a request for an object made by a first user system. In step 702, the request for the object is received at server system 220, and then communicated to content server 250. At step 704, the object is received at the server system 220, identified by the system as a multicast candidate, and reported to a scheduler module 335.

In step 706, a start stream control message is sent. A stream is a file or series of files involved in a single deltacast transfer. A control packet(s) can provide information about the stream to be sent and the stream ID so that each receiver can decide whether to accept and cache the stream. The start stream control packet(s) that are part of the control message may include the HTTP host name and the URL. If each receiver is going to make caching decisions, the start stream control packet(s) could also include other data about the stream, such as various classifiers and keywords describing the content. If caching decisions are going to be controlled from the server side, the control packet may include a list of user terminals or user terminal classifications which should cache the data. The system may first check whether a from server system 220 to a user system 210 connection has been initialized. If not, a UDP multicast socket may be created according to configuration parameters provided for the particular channel. Then the control packet may be pushed onto the UDP socket and communicated to user systems. Once the stream has been started, a deltacast coder 524 can send data via multicast processor 530. The sending modules may receive a data block from a coder along with the control information, such as the channel, streamID, pageID, and page position.

When sending a new stream, a multicast processor 530 may first adjust the membership in a throttle group associated with a channel. If the packet is the first packet for an associated stream set, the stream may be added to a throttle group for a channel. The throttle group purpose is to block the incoming sockets when the multicast channel is backed up because of bandwidth constrictions. If the packet is the last packet for a stream set, the stream may be removed from the throttle group for the channel.

Next, a packet or group of packets is added to a queue. When the system is ready to emit packets, a block is popped from the front of the list. When all of the data has been packetized, the block is released, and multicast processor 530 emits as much data as allowed by the current bandwidth limits. After each packet is synthesized, a copy is added to a retransmit list in case a NACK or other reliability request is received from a user within a given time frame. After sending the packet, the throttle is checked to see if the sending of the packet allows the throttle to be released. The packets are then transmitted to the user systems as part of step 706.

In step 708, a user system receiver monitors a set of channels for incoming data. Such a receiver may simply read data for all inputs, or may distinguish between data and control packets in order to determine what objects to receive. In certain embodiments, a receiver reads the header of the incoming packet. If the packet is starting a new stream, the receiver starts a new file. The receiver then checks if it needs to start a new page. In one potential implementation, pages are 1 MByte pages, but may alternatively be any suitable size or format. Each file may consist of one or more pages. A stream start flag is set for the first packet in the first block of the first page, and the stream end flag is set for the last packet in the last block of the last page.

As part of step 710, a map is created to track each page of the file, and which tracks which packets have been received. This tracking may be done via a page data map, which combines consecutive entries so that there is one map entry for every 'hole' in the map. For a requesting user system, the receiver issues NACKs in step 712 when holes are detected. The receiver can periodically scan the a map and issue NACKs for all holes in the page. The map may also be used to detect when a page is completed and ready to be uploaded. If the last packet is missed, a timer may be configured to issue a NACK indicating that the stream end flag was not received. Since the map essentially contains a list of holes, the page is complete when the end of the page has been seen but there are no map hole entries. If a NACK needs to be sent, a header may be added with packet data to identify the hole, and then the NACK will be sent via the session ITP socket. The server system responds to the NACKs in step 714, until the file download for the requesting user system is complete in step 716. At the same time, user systems which did not request the object and component packets have received the packets without issuing NACKs. These systems may hold packets and the page data map for a brief period to catch and remulticast packets that are sent in response from another systems NACK and the speculative prepositioning of packets is then complete for these systems in step 718.

If packets are still missing for a speculatively prepositioned file, the locations of missing data can be read from the page data map into a deltacasting block. The deltacasting blocks may include not only the data and block identifiers, but also a list of any missing packets. The dictionary index entries normally have a fixed size, but the amount of data needed to describe the missing locations can be different for each block. This may require the creation of a new storage block to store hole data. The fixed dictionary index entries can specify the start of this data in a circular buffer, or NULL if no packets are missing. A string of messages can then describe the holes for a page that is missing packets. The size of a circular buffer should be large enough to include all missing data for all blocks for a client with a poor link, as the size of such a buffer will still be small compared to the data blocks and a deltacasting block is useless without the hole information.

At some point, a system with a speculatively prepositioned block with holes will initiate a request for an associated object. Such a request for the object is received by a server system 220 in step 720. This embodiment enables the system to check a server for changes in the object since it was speculatively prepositioned. In alternative embodiments, the system may simply send a request for the holes if, for example, a staleness time has not passed.

In the embodiment of FIG. 7, the server system 220 responds to the request at step 720 by retrieving the object in step 722. A deltacast coder 524 may then pass object blocks to a module where checksums are calculated as match data. The match data is sent along with a block identifier in step 726. When the delta decoder on the receiver unpacks the block identifier in step 726, it checks its index to see if it is missing any packets in the block. If so, it sends an ITP control message back to the sender requesting retransmission of this data in step 728. The sender receives this message, and creates ITP output packets that include the missing hole data in step 730. This data needs to be sent losslessly in order to enable use of the object in response to the request for the object. The hole data may be transferred using a special global ITP substream using redundancy or other reliability mechanisms, and the hole data is transmitted to the requesting user system in step 730. Following receipt of the hole data by the receiver, the complete blocks are constructed and the file download is completed.

In one alternative illustrative embodiment, a first user watches a movie through a popular video-on-demand website by logging into the website using credentials (e.g., a user name and password) and viewing the movie through an embedded player surrounded by banner advertisements. Based on one or more determinations discussed above, the content set for the website may be multicast to the first (requesting) user and to a second (non-requesting) user, and may be stored in the second user's client dictionary without error checking in the second user's client dictionary. The second user's client dictionary may now include data blocks from a movie that include copyrighted material, from a web session authenticated according to another user's credentials, from advertisements that may be cycled and/or tracked, from web objects that are designated in metadata as "uncacheable" etc. As discussed above, embodiments of the client dictionary store the data blocks in such a way that may be effectively impossible for the first user to access the movie content directly from the client dictionary.

Instead, if the second user later requests the movie, the second user's experience may be much the same as that of the first user (e.g., and much the same as it would have been had the data not been stored in the client dictionary). For example, the second user may still visit the website using a web browser and may still log in with credentials. If authorized, the second user may still request an authorized, licensed copy of the movie file from the website, which may then be viewed in the embedded player surrounded by banner advertisements. However, as the data is received in response to the request, deltacasting techniques are used to fingerprint the data and identify the data as already being stored in the second user's client dictionary. Holes may be identified using block identifiers and checksum matching, with hole data sent to the second user system to complete the data requested by the second user. The data may then be communicated or presented to the second user accordingly, for example, by highly compressing the data according to a model of the client dictionary stored at the server side of the communications system (e.g., a client dictionary model).

As such, the use of deltacasting techniques may preserve legal and other obligations for content transactions. In the above example, the second user is unable to access copyright and/or unauthorized material from the client dictionary. Further, forcing the second user to access the content as intended by the content provider (e.g., through the provider's website) may allow the content provider to preserve advertising, hosting, and/or other relationships. For example, if the content provider happens to offer an advertisement that is already stored in the client dictionary, the advertisement may still be requested over the content network link (e.g., thereby providing any associated advertisement tracking, revenue, etc.) while also being highly compressed over the client-server communications link. This may further be enabled by the use of delayed reliability, such that a file which has not been error checked and any errors in the file prior to the request of the file may essentially create an unplayable file, thereby preserving the legal and other obligations for content transactions.

Figure 8:
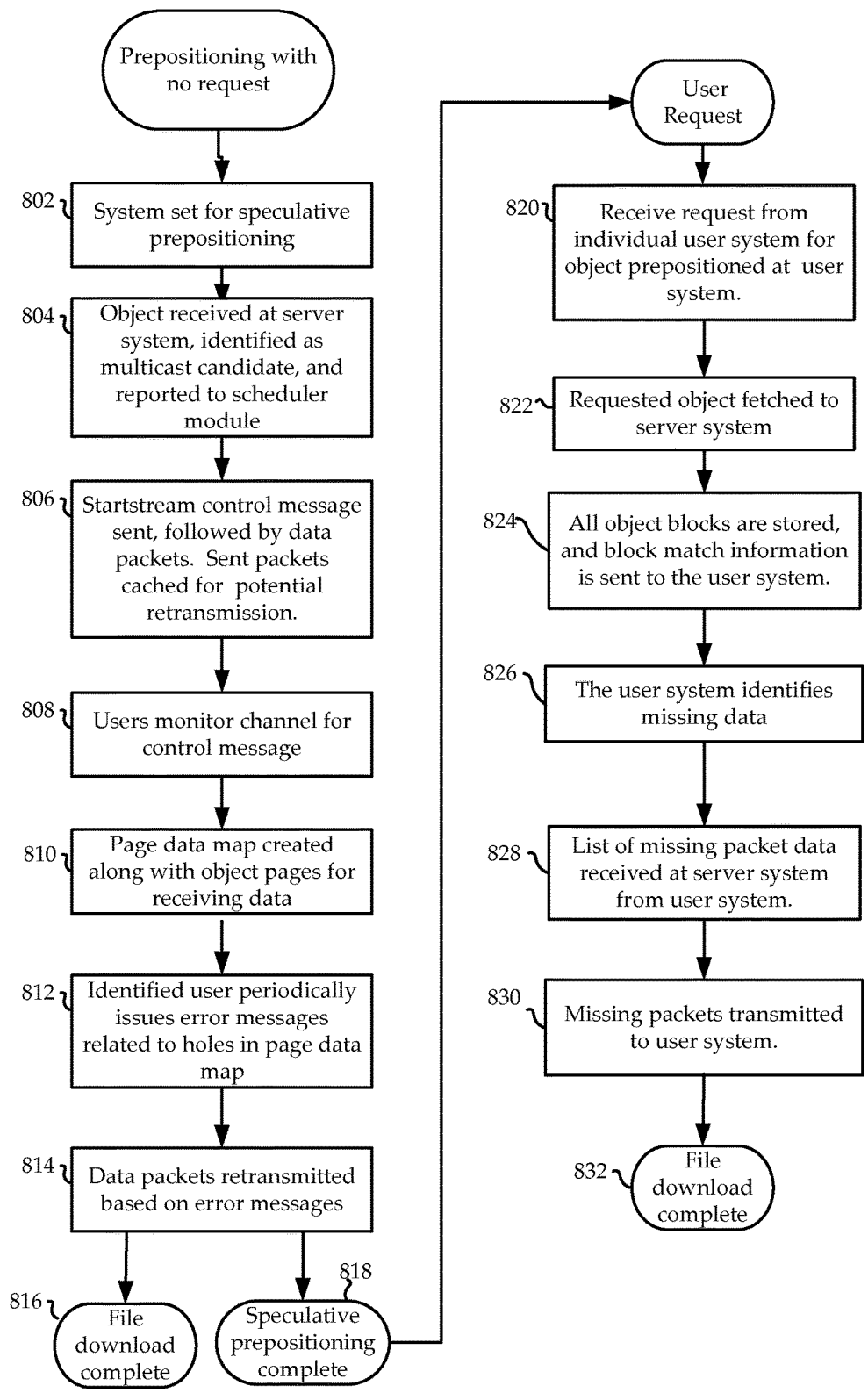
FIG. 8 shows a flow diagram of an illustrative method for using an embodiment of the innovations herein to handle multicast traffic reliability over a communications system with no initial requesting user, and with an identified or "canary" user.
Figure 9:
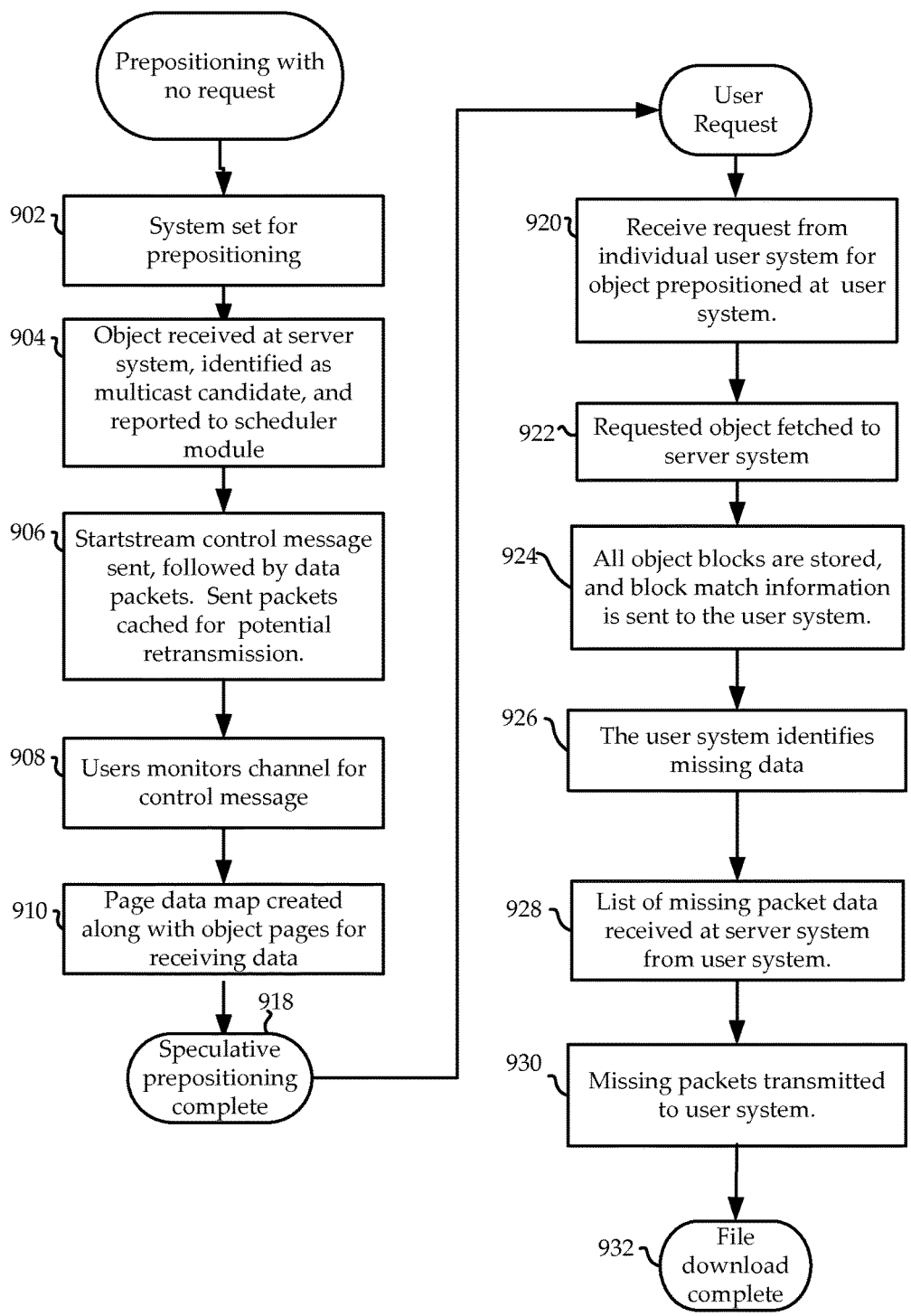
FIG. 9 shows a flow diagram of an illustrative method for using an embodiment of the innovations herein to handle multicast traffic reliability over a communications system with no initial requesting user, and no identified or "canary" user.

FIGS. 8 and 9 show additional alternative embodiments. In some circumstances, a system may take advantage of off peak usage or other times when the system is not operating at full capacity to speculatively preposition files that have not been selected by any user. Under these circumstances, the reverse channel may still be the constraining factor, and large volumes of errors in speculatively prepositioned files may overwhelm the reverse channel and degrade performance for other users. In these cases, the system may identify a user to issue error messages, as in FIG. 8. This identified or "canary" user may be selected randomly, or based on identified characteristics that enable an identified user to represent common error dynamics of user in the system. Alternatively, the system may operate without any initial error detection, as in FIG. 9. In further alternative embodiments, a multicast system may include certain decision thresholds for when to multicast object repair messages and when to utilize delayed error checking. For example, the system may unicast object repair messages until a certain number of error requests are seen from requesting users for the same object or block data, after which the repair messages may be multicast. Alternatively, the system may identify "canary" users after a first reliability message is received. The system may then request error information from one or more users that received the data as a speculative placement, or speculatively prepositioning data to the canary users with a specific request for immediate reliability messages as a way if identifying whether an initial reliability message from a requesting user was due to an individual system error or a system error that would impact many systems. A multicast decision may then be based on the results of the transmission to the canary user.

In FIG. 8, the system initial performs a step of identifying objects for speculative prepositioning in step 802. Because the object is not being identified by an initial user selection, the identification may be done based on usage data collected at a proxy server, a content server, a user system, or large groups of any combination of systems. The object may also be selected based on an expected demand, such as the release of a new movie for which there is no specific history of usage data.

After an object is selected and the system is set, the object is received and processed for multicasting in step 804. Just as with the corresponding steps in FIG. 7, in steps 806, 808, and 810, the object is sent to user systems. In step 812, the identified user issues error messages. Here, because the error messages are not specifically to create a file for immediate use by the identified user, the error messages are sent to enable multicast error messages for all users receiving the object as the data packets are retransmitted in step 814. In 816 and 818, the file is completed at the identified user, and prepositioning is finished at other user systems.

Following the completion of speculative prepositioning, a user may request the object in step 820. In steps 822-832, the delayed reliability check is performed just as in FIG. 7, and the error checked file is completed for user at the requesting user system.

Similarly, in FIG. 9, the system initial performs a step of identifying objects for speculative prepositioning in step 902. Again because the object is not being identified by an initial user selection, the identification may be done based on usage data or any other identified beneficial metric. After an object is selected and the system is set, the object is received and processed for multicasting in step 904. Just as with the corresponding steps in FIG. 7, in steps 906, 908, and 910, the object is sent to user systems. Unlike the embodiments of FIG. 7 and FIG. 8, no initial error checking is done, and every user system engages in delayed reliability. In step 918, speculative prepositioning is finished at all user systems. Following the completion of speculative prepositioning, a user may request the object in step 920. In steps 922-932, the delayed reliability check is performed just as in FIG. 7, and the error checked file is completed for the user at the requesting user system.

In further alternative embodiments, identified users may participate in delayed error checking, by functioning as trusted holders of an error checked copy of the object in place of the server when a user selects the object and initiates delayed reliability. Such implementations have added complexity, but the benefit of avoiding use of the reverse channel and high-latency forward channel in some systems. Other embodiments may use any combination of the above identified methods.

The above description is intended to provide various embodiments of the invention, but does not represent an exhaustive list of all embodiments. For example, those of skill in the art will appreciate that various modifications are available within the scope of the invention. Further, while the disclosure includes various sections and headings, the sections and headings are not intended to limit the scope of any embodiment of the invention. Rather, disclosure presented under one heading may inform disclosure presented under a different heading. For example, descriptions of embodiments of method steps for handling overlapping content requests may be used to inform embodiments of methods for handling anticipatory requests.

Specific details are given in the above description to provide a thorough understanding of the embodiments. However, it is understood that the embodiments may be practiced without these specific details. For example, well-known processes, algorithms, structures, and techniques may be shown without unnecessary detail in order to avoid obscuring the embodiments. Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field-programmable gate arrays (FPGAs), soft core processors, hard core processors, controllers, micro-controllers, microprocessors, other electronic units designed to perform the functions described above, and/or a combination thereof. Software can be used instead of or in addition to hardware to perform the techniques, blocks, steps, and means.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. Similarly, terms like "cache" are intended to broadly include any type of storage, including temporary or persistent storage, queues (e.g., FIFO, LIFO, etc.), buffers (e.g., circular, etc.), etc. The term "machine-readable medium" includes, but is not limited to, portable or fixed storage devices, optical storage devices, wireless channels, and/or various other storage mediums capable of storing that contain or carry instruction(s) and/or data.

Further, certain portions of embodiments (e.g., method steps) are described as being implemented "as a function of" other portions of embodiments. This and similar phraseologies, as used herein, intend broadly to include any technique for determining one element partially or completely according to another element. For example, a method may include generating a fingerprint from a first request and generating a determination "as a function of" the fingerprint. In various embodiments, the determination may be made in any way, so long as the outcome of the determination generation step is at least partially dependent on the outcome of the fingerprint generation step.

While the principles of the disclosure have been described above in connection with specific apparatuses and methods, it is to be clearly understood that this description is made only by way of example and not as limitation on the scope of the disclosure.

What is claimed is:

1. A method for providing reliability in a communications system having a server side in communication with a plurality of user systems via a shared communications infrastructure, the method comprising:

identifying, in response to receiving a request for a content object from a first user system, a second user system as an anticipatory user system that is presently not requesting the content object;

multicasting the content object over the shared communications infrastructure from the server side to at least the first and second user systems in response to the identifying;

first receiving, by the server side from the first user system in response to the multicasting, a first reliability message indicating which portions of the content object were received by the first user system via the multicasting;

first communicating, by the server side to at least the first user system in response to the first reliability message, a first repair message comprising at least some of the portions of the content object not received by the first user system via the multicasting as identified by the first reliability message;

second receiving, by the server side from the second user system, a request message explicitly requesting the content object, the request message being received after the multicasting the content object;

determining, by the server side, portions of the content object not received by the second user system via the multicasting; and second communicating, by the server side to at least the second user system in response to the request message, a response message comprising at least some of the portions of the content object determined as not received by the second user system via the multicasting.

2. The method of claim 1 wherein:
the first user system is identified as a canary user system that represents common error dynamics of a cross-section of user systems.

3. The method of claim 1 wherein:
the first reliability message comprises explicit positive acknowledgements of data packets of the content object that were successfully received by the first user system via the multicasting.

4. The method of claim 1 wherein:
the first reliability message comprises explicit negative acknowledgements of data packets of the content object that were not successfully received by the first user system via the multicasting.

5. The method of claim 1, wherein:
the first reliability message identifies holes in a page map corresponding to portions of the content object that were not successfully received by the first user system via the multicasting.

6. The method of claim 1 wherein:
the first reliability message is generated by the first user system in response to the first user system error-checking received multicast data of the content object.

7. The method of claim 1 wherein:
the first communicating comprises the server side unicasting the first repair message to the first user system.

8. The method of claim 1 wherein:
the first communicating comprises the server side multicasting the first repair message to at least the first and second user systems.

9. The method of claim 1 wherein:
the request message comprises a second reliability message indicating which portions of the content object were received by the second user system via the multicasting.

10. The method of claim 1 wherein:
the second receiving is in response to a request by the server side to the second user system for the second user system to communicate a second reliability message indicating which portions of the content object were received by the second user system via at least the multicasting.

11. The method of claim 10 wherein:
the second reliability message indicates which portions of the content object were not successfully received by the second user system via at least the multicasting and the first repair message.

12. The method of claim 10 wherein:
the response message comprises at least some of the portions of the content object not received by the second user system via at least the multicasting as identified by the second reliability message.

13. The method of claim 1, wherein the second communicating comprises:
determining, for each data block of the content object, whether the data block is presently stored in a local cache of the second user system; and
formulating the response message to comprise:
compressed instances of the data blocks determined to be presently stored in the local cache; and
uncompressed instances of the data blocks determined not to be presently stored in the local cache.

14. The method of claim 13, wherein the second communicating comprises:
unicasting the compressed instances of the data blocks to the second user system; and
multicasting the uncompressed instances of the data blocks to a plurality of user systems comprising the second user system.

15. The method of claim 13, wherein the determining comprises, for each data block of the content object:
computing a fingerprint of the data block as a function of byte-level information comprised by the content portion of the data block; and
determining that the data block is presently stored in the local cache of the second user system when the fingerprint matches an entry in a client dictionary model that is associated with the second user system and maintained by the server side.

16. A server system for providing reliability in a communications system, the server system in communication with a plurality of user systems via a shared communications infrastructure, the server system comprising:
a multicaster module that multicasts a content object over the shared communications infrastructure from the server side to at least first and second user systems; and
a server optimizer that:
identifies, in response to receiving a request for a content object from a first user system, a second user system as an anticipatory user system that is presently not requesting the content object, wherein the multicasting is by the multicaster module according to the identifying;
first receives, from the first user system in response to the multicasting, a first reliability message indicating which portions of the content object were received by the first user system via the multicasting;
directs first communication, to at least the first user system in response to the first reliability message, of a first repair message comprising at least some of the portions of the content object not received by the first user system via the multicasting as identified by the first reliability message;
second receives, from the second user system, a request message explicitly requesting the content object, the request message being received after the multicasting the content object;
determines portions of the content object not received by the second user system via the multicasting; and
directs second communication, to at least the second user system in response to the request message, of a response message comprising at least some of the portions of the content object determined as not received by the second user system via the multicasting.

17. The system of claim 16 wherein:
the first reliability message comprises explicit positive acknowledgements of data packets of the content object that were successfully received by the first user system via the multicasting.

18. The system of claim 16 wherein:
the first reliability message comprises explicit negative acknowledgements of data packets of the content object that were not successfully received by the first user system via the multicasting.

19. The system of claim 16 wherein:
the first reliability message identifies holes in a page map corresponding to portions of the content object that were not successfully received by the first user system via the multicasting.

20. The system of claim 16 wherein the server optimizer directs first communication by directing unicasting of the first repair message to the first user system.

21. The system of claim 16 wherein the server optimizer directs first communication by directing multicasting of the first repair message to the first user system.

22. The system of claim 16 wherein:
the server optimizer communicates a request to the second user system for the second user system to communicate a second reliability message indicating which portions of the content object were received by the second user system via the multicasting; and
the server optimizer second receives the second reliability message is in response to the request from the server optimizer.

23. The system of claim 16 wherein the server optimizer directs second communication by:
determining, for each data block of the content object, whether the data block is presently stored in a local cache of the second user system; and
formulating the response message to comprise:
compressed instances of the data blocks determined to be presently stored in the local cache; and
uncompressed instances of the data blocks determined not to be presently stored in the local cache.

24. The system of claim 23 wherein the server optimizer directs second communication further by:
unicasting the compressed instances of the data blocks to the second user system; and
multicasting the uncompressed instances of the data blocks to a plurality of user systems comprising the second user system.

25. The system of claim 23 wherein the determining comprises, for each data block of the content object:
computing a fingerprint of the data block as a function of byte-level information comprised by the content portion of the data block; and determining that the data block is presently stored in the local cache of the second user system when the fingerprint matches an entry in a client dictionary model that is associated with the second user system and maintained by the server side.

* * * * *